US012436978B2

(12) United States Patent
Kobayashi

(10) Patent No.: US 12,436,978 B2
(45) Date of Patent: Oct. 7, 2025

(54) INFORMATION PROCESSING SYSTEM AND INFORMATION PROCESSING PROGRAM

(71) Applicant: Yoshinori Kobayashi, Nagano (JP)

(72) Inventor: Yoshinori Kobayashi, Nagano (JP)

(*) Notice: Subject to any disclaimer, the term of this patent is extended or adjusted under 35 U.S.C. 154(b) by 187 days.

(21) Appl. No.: 18/538,516

(22) Filed: Dec. 13, 2023

(65) Prior Publication Data
US 2024/0232239 A1 Jul. 11, 2024

(30) Foreign Application Priority Data

Jan. 6, 2023 (JP) ................................ 2023-000808
Sep. 22, 2023 (JP) ................................ 2023-158197

(51) Int. Cl.
| G06F 16/3329 | (2025.01) |
| G06F 3/0484 | (2022.01) |
| G06F 40/169 | (2020.01) |
| G06F 40/274 | (2020.01) |

(52) U.S. Cl.
CPC ........ *G06F 16/3329* (2019.01); *G06F 3/0484* (2013.01); *G06F 40/169* (2020.01); *G06F 40/274* (2020.01)

(58) Field of Classification Search
CPC .............. G10L 13/08; G10L 2015/221; G10L 2015/223; G10L 15/10; G10L 15/14; G10L 15/22; G06F 40/35; G06F 16/3329; G06F 40/169; G06F 40/274; G06F 3/0484; H04L 51/21
See application file for complete search history.

(56) References Cited

U.S. PATENT DOCUMENTS

| 8,949,108 | B2* | 2/2015 | Cao ....................... G06F 40/143 |
| | | | 704/9 |
| 9,880,714 | B2* | 1/2018 | Gabbai ............... G06F 16/3322 |
| 10,366,107 | B2* | 7/2019 | McCloskey ......... G06F 16/3329 |
| 11,164,562 | B2* | 11/2021 | DiMascio ............. G10L 15/063 |
| 11,657,797 | B2* | 5/2023 | Vishnoi ................ H04L 51/214 |
| | | | 704/260 |
| 11,941,367 | B2* | 3/2024 | Lewis .................... G06N 5/041 |
| 12,190,064 | B2* | 1/2025 | Millius ............... H04M 3/4931 |

(Continued)

FOREIGN PATENT DOCUMENTS

JP  H10-323329 A  12/1998

OTHER PUBLICATIONS

Content Preparation and Management for Web Design: Eliciting, Structuring, Searching, and Displaying Information, Robert W. Proctor Purdue University (Year: 2002).*

*Primary Examiner* — Mohammad K Islam
(74) *Attorney, Agent, or Firm* — HAUPTMAN HAM, LLP

(57) ABSTRACT

The present invention provides an information processing system including a storage unit configured to store a plurality of first question items set in advance and a second question item set in advance based on a relationship between at least one pair of first question items selected from the plurality of first question items, an input reception unit configured to receive an input from a user, a display unit, and a control unit. The control unit first displays all first question items, and when first answer data corresponding to each of two first question items is input, displays a second question item corresponding to the two pieces of input first answer data, and repeats this processing until all first answer data and second answer data is input.

30 Claims, 27 Drawing Sheets

(56) References Cited

U.S. PATENT DOCUMENTS

| | | | |
|---|---|---|---|
| 2017/0132198 A1* | 5/2017 | Desai | G06F 3/16 |
| 2017/0359463 A1* | 12/2017 | Segalis | H04M 3/42042 |
| 2019/0325868 A1* | 10/2019 | Lecue | G10L 25/63 |
| 2020/0342873 A1* | 10/2020 | Teserra | G06F 40/295 |
| 2020/0356604 A1* | 11/2020 | Macdougall | G06N 20/00 |
| 2021/0067470 A1* | 3/2021 | Freed | G06F 18/23 |
| 2021/0144106 A1* | 5/2021 | Chen | G06F 40/35 |
| 2022/0027568 A1* | 1/2022 | Millius | G06F 40/30 |
| 2022/0050968 A1* | 2/2022 | Xie | H04L 51/02 |
| 2022/0247700 A1* | 8/2022 | Bhardwaj | G06N 3/044 |
| 2023/0142339 A1* | 5/2023 | Getselevich | G10L 15/16 |
| | | | 704/275 |
| 2023/0245651 A1* | 8/2023 | Wang | G06N 5/022 |
| | | | 704/275 |
| 2023/0274095 A1* | 8/2023 | Kelkar | H04M 3/527 |
| | | | 704/9 |
| 2023/0342554 A1* | 10/2023 | Millius | H04M 3/4931 |
| 2023/0419954 A1* | 12/2023 | Mittal | G10L 15/22 |
| 2024/0184992 A1* | 6/2024 | Yannam | G06F 40/35 |
| 2024/0283868 A1* | 8/2024 | Ferris | G06F 40/253 |
| 2025/0013821 A1* | 1/2025 | Chittari | G06F 3/04847 |
| 2025/0016267 A1* | 1/2025 | Willshire | G06F 16/22 |

\* cited by examiner

FIG.26

QUALITATIVE HINT 4

WORD THAT IS USED AT HIGH FREQUENCY IN "OUD" AND EXTERNAL DATA BUT IS NOT USED IN "TUD"
→ A POSSIBLE OMISSION

→ OUTPUT (POP UP)

QUALITATIVE HINT 5

VECTORS HAVING HIGH DEGREE OF COMMONALITY
AMONG ALL SINGLE FIELD VECTORS IN "TUD"

A POSSIBLE DUPLICATION

→ OUTPUT (POP UP OR HIGHLIGHT)

INFORMATION PROCESSING SYSTEM AND INFORMATION PROCESSING PROGRAM

CROSS-REFERENCE TO RELATED APPLICATION

This application is based upon and claims the benefit of priorities of prior Japanese Patent Applications No. 2023-000808, filed on Jan. 6, 2023 and No. 2023-158197, filed on Sep. 22, 2023 and the entire contents of which are incorporated herein by reference.

TECHNICAL FIELD

The present invention relates to an information processing system and an information processing program.

BACKGROUND ART

A system has been known that enables an information gathering person such as a sales representative, a doctor, or the like to perform efficient information gathering without omission in a situation of information gathering such as a sales activity or a medical inquiry to a patient. An outline of an electronic medical record system disclosed in Patent Literature 1 (PTL1: JP-A-10-323329) is as follows.

That is, the electronic medical record system includes a unit configured to input medical inquiry information, a unit configured to extract medical inquiry information to be handled in a medical record from the input medical inquiry information, a subjective data input and output unit configured to input and output subjective data of a patient, and a unit configured to display the medical inquiry information on the subjective data input and output unit. More specifically, medical inquiry information input in advance by a patient in a medical inquiry system is transferred to an input form corresponding to a classification according to predetermined classifications. Accordingly, it is possible to prevent omission of a medical inquiry when a doctor who is an information gathering party directly makes a medical inquiry to a patient.

SUMMARY OF INVENTION

Technical Problem

Here, when a technical idea grasped from the electronic medical record system disclosed in PTL 1 is applied to a situation of hearing such as a management consultation, the following problems occur.

First, a consulter who wants to have a management consultation often has confused thoughts and has difficulty in organizing his/her confused thoughts by himself/herself, and thus often comes for a consultation in hope of solving the confusion of thoughts.

On the other hand, even when prior information is assigned to information gathering items, if the information gathering person who receives the management consultation does not have enough knowledge or does not have much experience (not sufficiently skillful), a question may be omitted or repeated questions may be asked at the time of consultation, causing a decrease in efficiency of information gathering.

In addition, even when the information gathering person attempts to look into a relationship between the information gathering items, if the information gathering person gathers information on content narrated under the initiative of the consulter who has confused thoughts, the situation becomes more complicated. Consequently, the efficiency of information gathering further decreases. When the efficiency of information gathering decreases, the consulter finds it difficult to conduct information disclosure, a sufficient information gathering survey cannot be performed, and the confusion of thoughts of the consulter cannot be solved.

Solution to Problem

The invention has been made to solve the above-described complex problems, and an object of the invention is to provide an information processing system and an information processing program capable of organizing confused thoughts of a consulter, and preventing a decrease in efficiency of information gathering even in a situation where a hearing skill of an information gathering party is not sufficient and a hearing is complicated.

An information processing system according to the invention includes: a storage unit configured to store a plurality of first question items set in advance and a second question item set in advance based on a relationship between at least one pair of first question items selected among the plurality of first question items: an input reception unit configured to receive an input from a user: a display unit: and a control unit. The control unit executes the following: first processing in which each of the first question items is displayed on the display unit: second processing in which in a case where first answer data corresponding to each of two first question items among the first question items displayed on the display unit is input by the user, when there is an unanswered second question item corresponding to the input first answer data, the display unit displays the unanswered second question item and an unanswered first question item, and when there is no unanswered second question item corresponding to the input first answer data, the display unit continuously displays an unanswered first question item: third processing in which each time first answer data corresponding to the first question item is input, presence or absence of a second question item based on a relationship between first question items corresponding to the already input first answer data is confirmed, and when an unanswered second question item is present, the display unit displays the unanswered second question item as well as a second question item and a first question item that are displayed but unanswered, and when there is no unanswered second question item, the display unit continuously displays a second question item and a first question item that are displayed but unanswered: fourth processing in which the third processing is repeatedly executed until all first answer data corresponding to each of the first question items and all second answer data corresponding to each of the second question items is input: and fifth processing in which each time the first answer data and the second answer data is input or after all the first answer data and all the second answer data is input from the second processing to the fourth processing, the input first answer data and the input second answer data are stored in the storage unit.

By adopting this configuration, as soon as predetermined two pieces of first answer data is input, a corresponding second question item is displayed and an input of second answer data is received. Accordingly, even when a hearing skill of an information gathering party is not sufficient, a reliable hearing can be conducted efficiently without omission or duplication of question items and without the information gathering party getting confused about the order in information gathering. In addition, from the side of a consulter, confused thoughts can be organized.

Further, when question items and answer data stored in the storage unit are output by a printer or the like, the consulter can present his/her organized thoughts as a material to others.

In addition, priorities of the plurality of stored first question items may be set in advance and stored in the storage unit.

According to this configuration, by determining the priorities of the plurality of first question items, a description order (display order) in outputting on a printer or the like can be made clear, and the consulter's thoughts in an organized state can be output as an easy-to-understand material.

In addition, the control unit may cause the display unit to constantly display a priority change field to enable change of the priorities of the plurality of first question items stored in the storage unit, and when a changed priority is input into the priority change field, store change data of the input priority in the storage unit.

According to this configuration, since it is possible to change the priorities of the first question items at any timing, it is possible to newly determine which of the question items is important (which has a higher priority) at any timing during the input of the answer data or at the time of output, and to print the question items in an order of priority according to the consulter.

In addition, when outputting collectively the first question item, the second question item, the first answer data, and the second answer data stored in the storage unit, the control unit may execute the output in an order of a first question item having a higher priority, first answer data associated with the first question item having a higher priority, a second question item including first answer data having a higher priority, and second answer data corresponding to the second question item having a higher priority, based on the priorities of the first question items that are set in advance and stored.

According to this configuration, an output printed matter is obtained by organizing the confused thoughts of the consulter, and since it is possible to present the printed matter containing the organized thoughts and describe the organized thoughts to others, the consulter can easily and clearly perform the description to others.

In addition, when collectively outputting the first question item, the second question item, the first answer data, and the second answer data stored in the storage unit, the control unit may execute the output in an order of a first question item having a higher priority, first answer data associated with the first question item having a higher priority, a second question item including first answer data having a higher priority, and second answer data corresponding to the second question item having a higher priority, based on priorities of the first question items that are stored after being changed from the priorities set in advance.

According to this configuration, a printed matter output after change of the priority at any timing is obtained by organizing the confused thoughts of the consulter, and since it is possible to present the printed matter containing the organized thoughts and describe the organized thoughts to others, the consulter can easily and clearly perform the description to others.

In addition, the control unit may cause the display unit to display a display for confirming presence or absence of additional first answer data after all the first answer data corresponding to each of the first question items and all the second answer data corresponding to each of the second question items are input, cause the display unit to display an input field of additional first answer data when a message indicating that additional first answer data is present is input by a user, when additional first answer data is input, cause the display unit to display an input field for inputting an additional second question item between the input additional first answer data and already input first answer data, cause the display unit to display an input field for inputting additional second answer data corresponding to the additional second question item, and store the additional first answer data, the additional second question item, and the additional second answer data in the storage unit each time the additional first answer data, the additional second question item and the additional second answer data corresponding to the additional second question item are input or after all additional first answer data, all additional second question items and all additional second answer data corresponding to the additional second question items are input.

According to this configuration, when there are contents to be additionally given as answers from the side of the consulter, since new second question items can be set based on the additional answer data and new second answer data can be obtained, a sufficient hearing can be conducted.

In addition, when a predetermined number of pieces or more of additional first answer data is input, the control unit may cause the display unit to display a message for stopping subsequent input of the additional first answer data.

According to this configuration, it is possible to prevent a situation in which too many new second question items are generated due to presence of the predetermined number of pieces or more of additional first answer data, leading to a complicated hearing.

In addition, the control unit may store the input additional first answer data in association with first answer data that is an answer to a same first question item among a plurality of pieces of already input first answer data, cause the display unit to display an input field for inputting a priority of the additional first answer data and the already input first answer data that are associated with each other, and store input priorities in the storage unit for the plurality of pieces of already input first answer data and the input additional first answer data that are associated with each other.

According to this configuration, by associating the additionally input first answer data with the already input first answer data and determining the priorities thereof, a description order (display order) at the time of output by a printer or the like can be made clear, and the consulter's thoughts in an organized state can be output as an easy-to-understand material.

In addition, the control unit may cause the display unit to constantly display an additional answer data priority change field to enable change of a priority input with respect to a plurality of pieces of already input first answer data and the input additional first answer data that are associated with each other and stored in the storage unit, and when a changed priority is input into the additional answer data priority change field, store change data of the input priority in the storage unit.

According to this configuration, by associating the additionally input first answer data with the already input first answer data and changing the priorities thereof at any timing during the consultation, a description order (display order) at the time of output by a printer or the like can be made clear, and the consulter's thoughts in an organized state can be output as an easy-to-understand material.

In addition, when collectively outputting the first question item, the second question item, the first answer data, the second answer data, the additional first answer data, the additional second question item, and the additional second answer data stored in the storage unit, the control unit may execute the output in an order of a first question item having a higher priority, first answer data having a higher priority among first answer data and additional first answer data associated with the first question item having a higher priority, a second question item or an additional second question item including first answer data having a higher priority, and second answer data or additional second answer data corresponding to the second question item or additional second question item having a higher priority, based on priorities of first question items stored in advance or stored after being changed and the priorities of the plurality of pieces of already input first answer data and the input additional first answer data that are associated with each other.

According to this configuration, an output printed matter is obtained by organizing the confused thoughts of the consulter, and since it is possible to present the printed matter containing the organized thoughts and describe the organized thoughts to others, the consulter can easily and clearly perform the description to others.

In addition, when collectively outputting the first question item, the second question item, the first answer data, the second answer data, the additional first answer data, the additional second question item, and the additional second answer data stored in the storage unit, the control unit may execute the output in an order of a first question item having a higher priority, first answer data having a higher priority among first answer data and additional first answer data associated with the first question item having a higher priority, a second question item or an additional second question item including first answer data having a higher priority, and second answer data or additional second answer data corresponding to the second question item or additional second question item having a higher priority, based on priorities of first question items stored in advance or stored after being changed and the priorities stored after being changed of the plurality of pieces of already input first answer data and the input additional first answer data that are associated with each other.

According to this configuration, a printed matter output after change of the priority at any timing is obtained by organizing the confused thoughts of the consulter, and since it is possible to present the printed matter containing the organized thoughts and describe the organized thoughts to others, the consulter can easily and clearly perform the description to others.

In addition, the control unit may cause the display unit to constantly display a question item change button to enable change, addition, or deletion of contents of the plurality of first question items and/or a plurality of the second question items stored in the storage unit, stop the first processing to the fifth processing in execution when the question item change button is pressed, cause the display unit to display a question item change field, and store change contents or addition contents input in the question item change field of the display unit in the storage unit, and when deletion of the first question item and/or the second question item is input in the question item change field, delete an instructed first question item and/or second question item from the storage unit.

In addition, the control unit may cause the display unit to display an input field for inputting which of the first answer data and/or the second answer data stored in the storage unit attachment data serving as a supplementary material for the first answer data and/or the second answer data is to be associated with, and store the attachment data and the first answer data and/or the second answer data in the storage unit in association with each other based on contents input into the input field.

An information processing program according to the invention is readable by a computer, the computer including a storage unit configured to store a plurality of first question items set in advance and a second question item set in advance based on a relationship between at least one pair of first question items selected among the plurality of first question items, an input reception unit configured to receive an input from a user, a display unit, and a control unit, the program causing the control unit to execute the following: first processing in which each of the first question items is displayed on the display unit: second processing in which in a case where first answer data corresponding to each of two first question items among the first question items displayed on the display unit is input by the user, when there is an unanswered second question item corresponding to the input first answer data, the display unit displays the unanswered second question item and an unanswered first question item, and when there is no unanswered second question item corresponding to the input first answer data, the display unit continuously displays an unanswered first question item; third processing in which each time first answer data corresponding to the first question item is input, presence or absence of a second question item based on a relationship between first question items corresponding to the already input first answer data is confirmed, and when an unanswered second question item is present, the display unit displays the unanswered second question item as well as a second question item and a first question item that are displayed but unanswered, and when there is no unanswered second question item, the display unit continuously displays a second question item and a first question item that are displayed but unanswered; fourth processing in which the third processing is repeatedly executed until all first answer data corresponding to each of the first question items and all second answer data corresponding to each of the second question items is input; and fifth processing in which each time the first answer data and the second answer data is input or after all the first answer data and all the second answer data is input from the second processing to the fourth processing, the input first answer data and the input second answer data are stored in the storage unit.

By adopting this configuration, as soon as predetermined two pieces of first answer data is input, a corresponding second question item is displayed and an input of second answer data is received. Accordingly, even when a hearing skill of an information gathering party is not sufficient, a reliable hearing can be conducted efficiently without omission or duplication of question items and without the information gathering party getting confused about the order in information gathering. In addition, from the side of a consulter, confused thoughts can be organized.

Further, when question items and answer data stored in the storage unit are output by a printer or the like, the consulter can present his/her organized thoughts as a material to others.

Advantageous Effects of Invention

According to the invention, even in a situation in which a hearing skill of an information gathering party is not sufficient and a hearing is complicated, it is possible to prevent a decrease in efficiency of information gathering and to efficiently conduct the hearing without omission, and accordingly it is possible to organize confused thoughts of a consulter based on a relationship between elements.

BRIEF DESCRIPTION OF DRAWINGS

FIG. 26 is an explanatory diagram explaining an output of a qualitative hint 4.

DESCRIPTION OF EMBODIMENTS

First Embodiment

An information processing system and an information processing program of the embodiment are mainly intended to be used in a situation of a management consultation. More specifically, a situation may be assumed in which an information gathering party, which refers to a management consultant or a management counselor of an economic organization or the like, receives a management consultation from a consulter such as a manager of a company.

More specifically, a case is assumed where a management consultation occurs in a chamber of commerce and industry or the like, with a counselor who belongs to the chamber of commerce and industry or who is commissioned by the chamber of commerce and industry being set as a user (an information gathering person), and a member of the chamber of commerce and industry (a manager of a company) being set as a consulter.

The information processing system according to the embodiment sets and stores a plurality of first question items relating to at least one of various discussion points relating to management, for example, "management philosophy", "management policy", "management strategy", "mission", "management vision", "management situation", "management analysis", "management problem", "management task", "business plan", "management plan", "action plan", "motion plan", "solution", "management improvement", "securing of human resources", "human resources training", "improvement of productivity", "improvement of technical strength", "enhancement of development capabilities", "branding", "improvement of customer satisfaction", "cost down", "business enhancement", "enhancement of sales force", "procurement of management resources", "optimization of personnel rating", "organizational restructuring", "review of business flow", "analysis of rival companies", "fund raising", "facility investment", and "contract conditions", and further sets and stores a second question item corresponding to two first question items.

Then, the information processing system and the information processing program according to the embodiment cause a plurality of first question items to be displayed first, cause the information gathering party to ask the consulter a question based on the displayed first question items, and when answers to at least two or more first question items are obtained, cause second question items corresponding to the two first question items to be displayed, and cause unanswered question items to be displayed until answers to all the first question items and all the second question items are obtained.

Information Processing System S1

Figure 1:
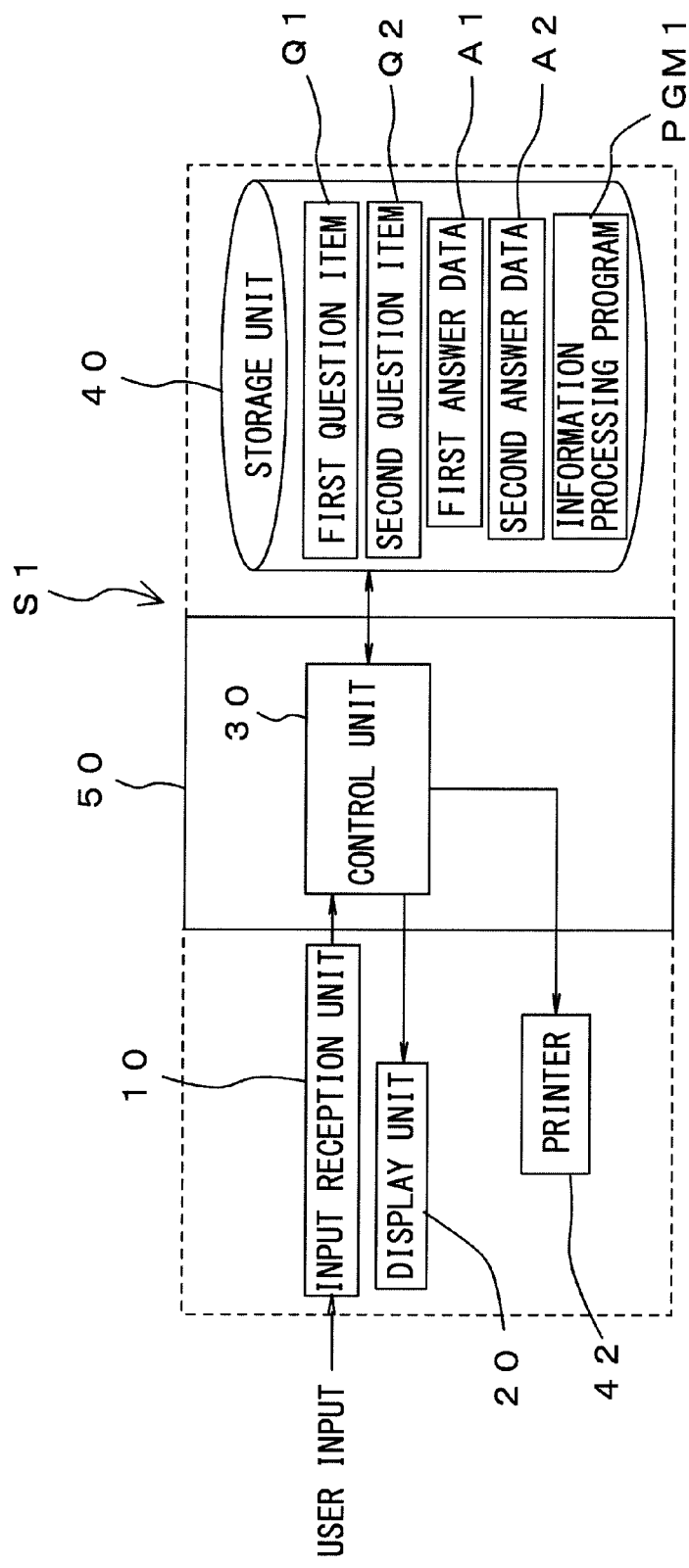
FIG. 1 is a block diagram of an information processing system according to a first embodiment.

Next, an information processing system S1 will be described in detail with reference to FIG. 1.

The information processing system S1 according to the embodiment includes a storage unit 40 configured to store a plurality of first question items Q1 set in advance and a second question item Q2 set in advance based on a relationship between at least one pair of first question items Q1 among the plurality of first question items Q1, an input reception unit 10 configured to receive an input from a user (an information gathering person), a display unit 20, and a control unit 30. At least the control unit 30 is provided in a control device 50.

Control Device 50

Next, an overall configuration of the control device 50 will be described. As an example, the control device 50 is implemented by an information processing device such as a personal computer or a workstation, or a portable information terminal such as a smartphone or a tablet. That is, the control device 50 includes a CPU, memories such as a RAM and a ROM, and a communication unit, and operates based on a preset information processing program PGM1 and a setting signal input from the input reception unit 10.

The storage unit 40 corresponds to, for example, a ROM, a hard disk, or an SSD, which is a nonvolatile memory. The storage unit 40 stores the first question item Q1, the second question item Q2, and the information processing program PGM1 for causing the control unit 30 to perform an operation as the information processing system S1.

The storage unit 40 also stores first answer data A1 answered to the first question item Q1 and second answer data A2 answered to the second question item Q2.

Although the storage unit 40 is provided in the control device 50 in the above example, the storage unit 40 may be provided in an external device (cloud or the like) such as a server different from the control device 50.

The control unit 30 corresponds to a CPU, and calls the information processing program PGM1 from the storage unit 40 to sequentially execute predetermined types of processing.

The display unit 20 corresponds to a display, and the input reception unit 10 corresponds to a mouse or a keyboard. On a screen of the display unit 20, the question items Q1 and Q2 and input fields at positions corresponding to the question items Q1 and Q2 (for example, below the question items) are displayed by the control unit 30. Then, when the user (information gathering person) inputs an answer to the input field using the input reception unit 10, the input first answer data A1 and second answer data A2 are input to the storage unit 40 of the information processing system S1.

Although the input reception unit 10 and the display unit 20 are provided in the control device 50 in the above example, the input reception unit 10 and the display unit 20 may be provided in an external device. That is, the input reception unit 10 and the display unit 20 may be implemented as a touch panel type tablet terminal, and in this case, the tablet terminal has functions of the input reception unit 10 and the display unit 20.

First Question Item and Second Question Item

Figure 2:
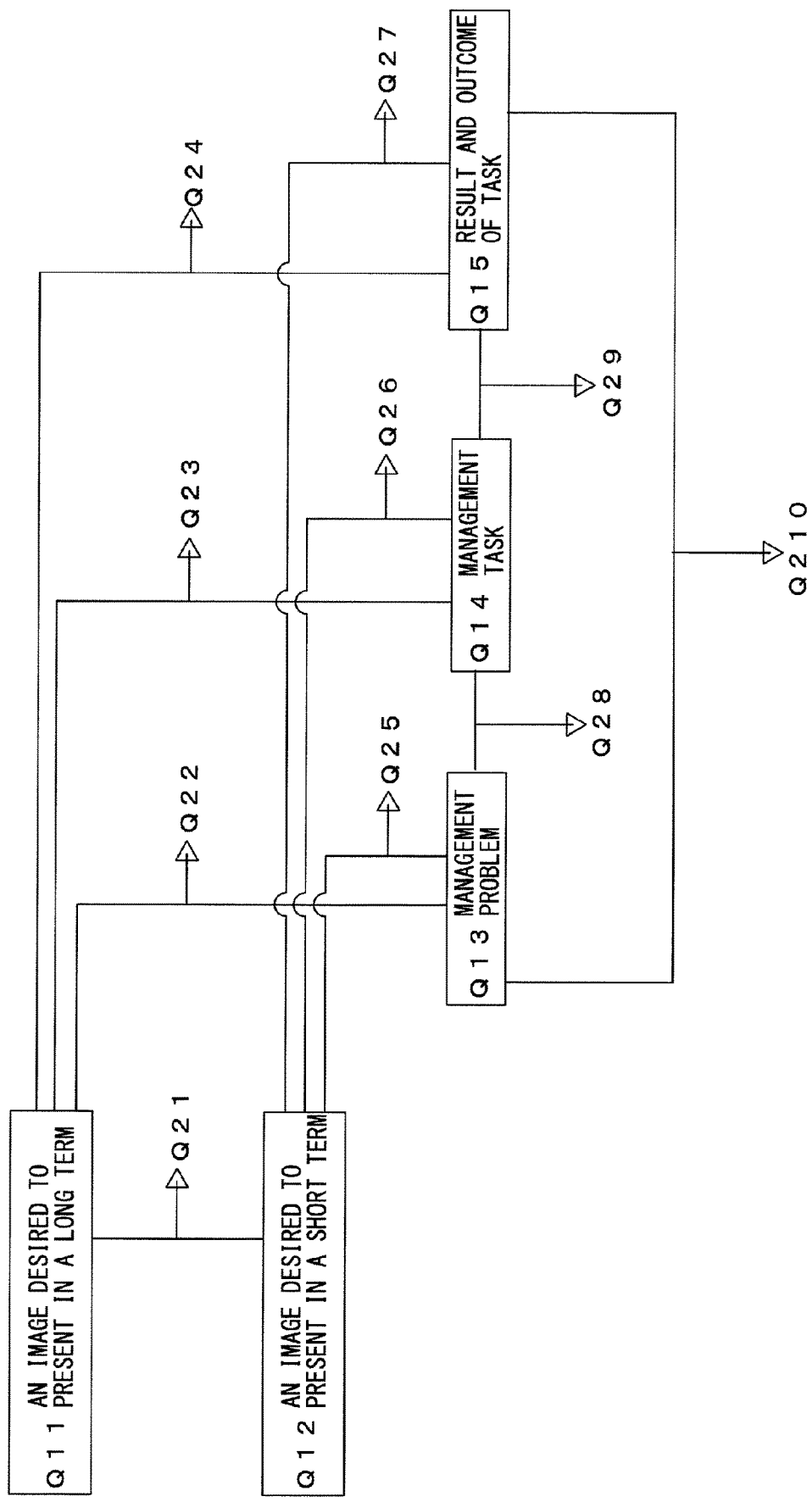
FIG. 2 is an explanatory diagram illustrating a relationship between a first question item and a second question item.

FIG. 2 is a schematic explanatory diagram illustrating a relationship between the first question item and the second question item in the embodiment.

The first question item Q1 is input in advance by a user (information gathering person) or a system creator (an information processing program creator) before a consultation is started.

The first question item Q1 in the embodiment includes five (Q11 to Q15), that is, question items including Q11 "an image desired to present in a long term" and Q12 "an image desired to present in a short term" regarding "management vision", and question items including Q13 "a management problem perceived by the manager", Q14 "a management task desired to be performed by the manager", and Q15 "a result and outcome of the task" regarding "management situation". Hereinafter, although a case of the first question item Q1 (Q11 to Q15) described above will be described in each embodiment, the first question item according to each embodiment is not limited to the concept, the situation, and the number (five) described above. Further, when the present system is used for purposes other than the management consultation, the content of the first question item naturally differs from the above-described content.

The five first question items Q11 to Q15 may be assigned with respective priorities and stored in advance in the storage unit 40. In a general order of Q11, Q12, Q13, Q14, and Q15, priorities thereof decrease. In the embodiment, the order is "the image desired to present in a long term" having the highest priority, followed by "the image desired to present in a short term", "the management problem perceived by the manager", "the management task desired to be performed by the manager", and "the result and outcome of the task".

By setting the priority in advance among the first question items Q11 to Q15 in this manner, it is possible to make it easy to view and understand a display order and a description order at the time of outputting as described later.

The priorities of the five first question items Q11 to Q15 can be changed at any timing.

In this case, the control unit 30 causes the display unit 20 to constantly display a "change priority" button (not shown). When a user (an information gathering person) or a consulter presses the "change priority" button, the control unit 30 causes the display unit 20 to display a priority input field (not illustrated) for the first question items Q11 to Q15. When the user (the information gathering person) or the consulter inputs a priority in the priority input field, the control unit 30 stores the input priority as a new priority in the storage unit 40.

It is assumed that such a change of the priority can be performed many times.

Next, the first answer data A1 according to each embodiment will be described.

The first answer data A1 corresponding to each first question item Q1 is stored in the storage unit 40 via the input reception unit 10. The first answer data A1 is input by the user (information gathering person) during the consultation.

As described above, in a case where the first question item Q1 includes Q11 "the image desired to present in a long term", Q12 "the image desired to present in a short term", Q13 "the management problem perceived by the manager", Q14 "the management task desired to be performed by the manager", and Q15 "the result and outcome of the task", as an example of the first answer data, the first answer data A1 in a free answer form including concepts of "annual sales in 20 years", "the number of trading partner companies in one year", "sluggish growth in the number of customers", "increase in sales channels", and "stable increase in the number of customers" is intended to be input. Although the user who inputs the first answer data A1 is assumed to be an information gathering person, the user may be a consulter.

Next, the second question item Q2 according to the embodiment will be described.

The second question item Q2 is set in advance based on a relationship between at least one pair of first question items selected by the user (information gathering person) or the system creator (information processing program creator) among the plurality of first question items Q1. The second question item Q2 is input in advance by the user (information gathering person) or the system creator (information processing program creator) before the consultation is started.

The second question item Q2 corresponding to the first question item Q1 in the above example is exemplified as follows. For example, a second question item Q21 "whether the image desired to present in a short term is a trial stone of the image desired to present in a long term" is set based on a relationship between Q11 "the image desired to present in a long term" and Q12 "the image desired to present in a short term", and a second question item Q28 "whether there is a leap of logic between the management problem and the management task" is set based on a relationship between Q13 "the management problem perceived by the manager" and Q14 "the management task desired to be performed by the manager". The second question item Q2 may be set in advance for all combinations of pairs of the first question items Q1, or may be set in advance for at least one pair of the first question items Q1.

The second answer data A2 corresponding to each second question item Q2 is stored in the storage unit 40 via the input reception unit 10.

As described above, in a case where the second question item Q2 includes a question item such as Q21 "whether the image desired to present in a short term is a trial stone of the image desired to present in a long term" or Q28 "whether there is a leap of logic between the management problem and the management task", as an example, the second answer data A2 may be two options of "Yes" and "No" or may be a free answer other than "Yes" or "No". Although the user who inputs the second answer data A2 is assumed to be an information gathering person, the user may be a consulter.

When answers to any two of the five first question items Q11 to Q15 are obtained, the second question item Q2 corresponding to the two first question items Q1 is further set. In the embodiment, since the second question item Q2 is set for all the combinations of the five first question items Q1, ten second question items Q21 to Q210 are set.

A plurality of question items may be set for each of the second question items Q21 to Q210, and in this case, ten or more second question items may be set.

Furthermore, regarding the second question item of the embodiment, although ten question items are assumed based on all combinations corresponding to any two of the five first question items, it is not limited to setting the second question item for all combinations of the first question items. Accordingly, the number of second question items may be less than 10. When the number of first question items changes, the number of second question items also changes accordingly.

An example of the second question item Q2 according to the embodiment will be described below.

In the embodiment, Q21 "whether the image desired to present in a short term is a trial stone of the image desired to present in a long term" corresponding to Q11 "the image desired to present in a long term" and Q12 "the image desired to present in a short term" is set. Other examples of the question of Q21 include whether there is a target image desired to present in a short term.

In addition, Q22 "whether a management problem is set in consideration of the image desired to present in a long term" corresponding to Q11 "the image desired to present in a long term" and Q13 "the management problem perceived by the manager" is set. Other examples of the question of Q22 include whether a reason other than the image desired to present in a long term is present in the background.

In addition, Q23 "whether the task is appropriate considering the image desired to present in a long term" corresponding to Q11 "the image desired to present in a long term" and Q14 "the management task desired to be performed by the manager" is set. Other examples of the question of Q23 include whether a management task is set in consideration of the image desired to present in a long term.

In addition, Q24 "whether an intended effect based on the image desired to present in a long term is assumed" corresponding to Q11 "the image desired to present in a long term" and Q15 "the result and outcome of the task" is set. Other examples of the question of Q24 include how much the intended effect realizes the image desired to present in a long term.

In addition, Q25 "whether a problem that inhibits the image desired to present in a short term can be set" corresponding to Q12 "the image desired to present in a short term" and Q13 "the management problem perceived by the manager" is set. Other examples of the question of Q25 include "Isn't setting a different problem more direct to the image desired to present in a short term?"

In addition, Q26 "whether the task promotes the image desired to present in a short term" corresponding to Q12 "the image desired to present in a short term" and Q14 "the management task desired to be performed by the manager" is set. Other examples of the question of Q26 include "Doesn't the task interfere with other tasks already set about?"

In addition, Q27 "how much the intended outcome realizes the image desired to present in a short term" corresponding to Q12 "the image desired to present in a short term" and Q15 "the result and outcome of the task" is set. Other examples of the question of Q27 include "Isn't greater outcome necessary for the image desired to present in a short term?"

In addition, Q28 "whether there is a leap of logic between the problem and the task" corresponding to Q13 "the management problem perceived by the manager" and Q14 "the management task desired to be performed by the manager" is set. Other examples of the question of Q28 include whose what material is used to set the management task.

In addition, Q29 "whether a direct result and an intended outcome based on a management task to be tackled are connected" corresponding to Q14 "the management task desired to be performed by the manager" and Q15 "the result and outcome of the task" is set. Other examples of the question of Q29 include whether a countermeasure is considered by grasping a result other than the intended outcome.

In addition, Q210 "whether the intended outcome is necessary and sufficient to solve the management problem" corresponding to Q13 "the management problem perceived by the manager" and Q15 "the result and outcome of the task" is set. Other examples of the question of Q210 include whether it is possible to pick up and evaluate the influence on the management problem that is brought about by a result of a task other than the intended outcome.

Next, operations executed by the information processing program according to the embodiment will be described with reference to FIG. 3.

First, the control unit 30 calls a plurality of first question items Q1 from the storage unit 40 and causes the display unit 20 to display the first question items Q1 (step S100).

Figure 4:
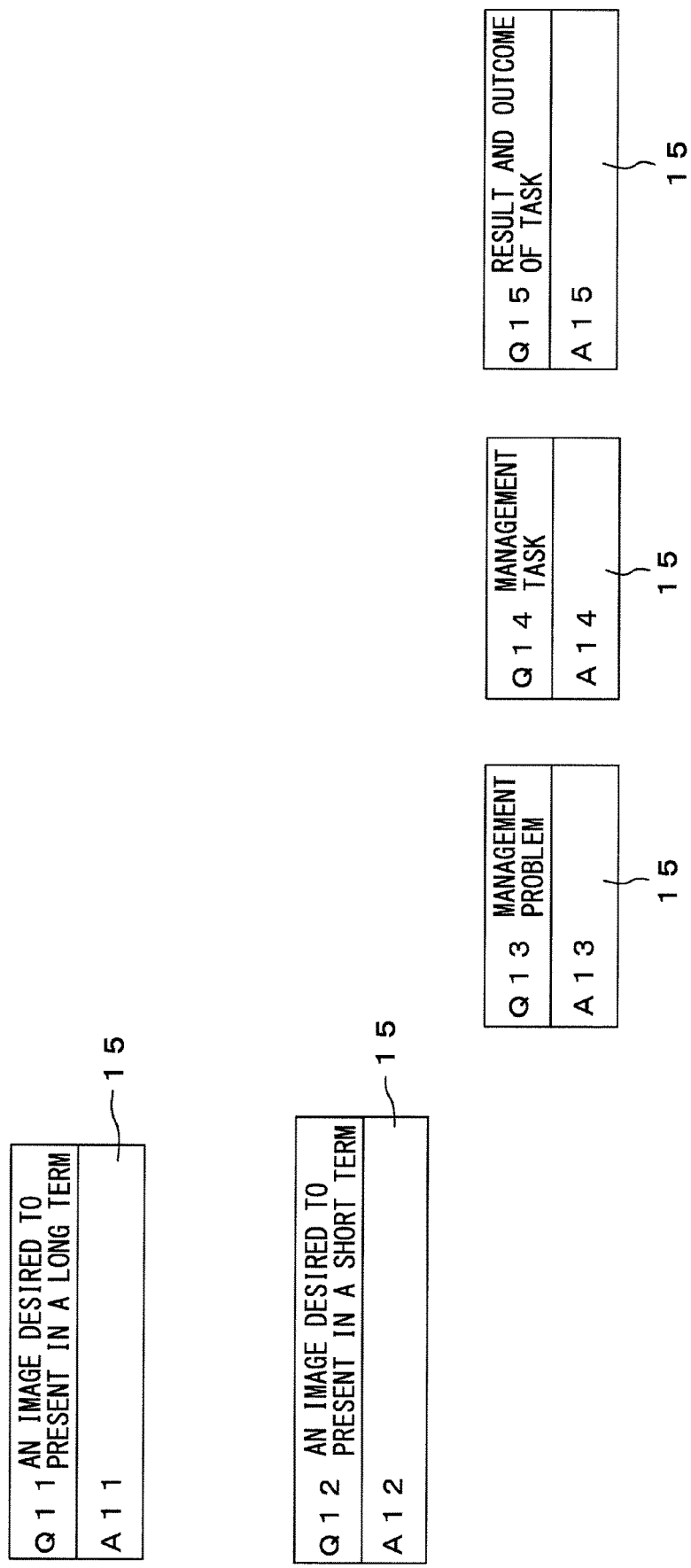
FIG. 4 is an explanatory diagram of input fields for a first question item and first answer data displayed on a display unit according to the first embodiment.

In the embodiment, on the screen of the display unit 20, the first question items Q1 of Q11 "the image desired to present in a long term", Q12 "the image desired to present in a short term", Q13 "the management problem perceived by the manager", Q14 "the management task desired to be performed by the manager", and Q15 "the result and outcome of the task" are displayed (see FIG. 4).

In step S100, the control unit 30 controls the display unit 20 to display input fields 15 of the first answer data A1 corresponding to the first question items Q1.

Although an example in which the corresponding input field 15 of the first answer data A1 is provided at a position adjacent to the corresponding first question item Q1 is illustrated in FIG. 4, the input field 15 of the first answer data A1 may be displayed anywhere in the display unit 20. However, by providing the corresponding input field 15 of the first answer data A1 at a position adjacent to the corresponding first question item Q1, the user (information gathering person) can easily tell to which question item an answer corresponds.

The user (information gathering person) asks a consulter the plurality of first question items Q1 in any order that are displayed on the display unit 20, and as soon as there is an answer, inputs the first answer data A1 from the input reception unit 10 into the corresponding input field 15 of the first answer data A1.

The control unit 30 stores the first answer data A1, which is input into the input field 15 from the input reception unit 10, in the storage unit 40 (step S102).

As an example, in a case where the user (information gathering person) asks Q11 "the image desired to present in a long term" and the consulter gives an answer of, for example, "XX yen of annual sales in 20 years" corresponding to the question item, the user (information gathering person) inputs the first answer data A1 from the input reception unit 10 into the input field 15 indicated by A11. The control unit 30 stores first answer data A11 in the storage unit 40.

Next, when the first answer data A1 corresponding to at least two first question items Q1 among the first question items Q1 displayed on the display unit 20 is input by the user (information gathering person) (step S104), the control unit 30 determines whether an unanswered second question item Q2 corresponding to the at least two pieces of input first answer data A1 is present (step S106).

When it is determined in step S104 that the first answer data A1 corresponding to at least two first question items Q1 is not input, the control unit 30 returns to step S102 and continuously displays only the first question item Q1 on the display unit 20 until a next piece of first answer data A1 is input.

Figure 5:
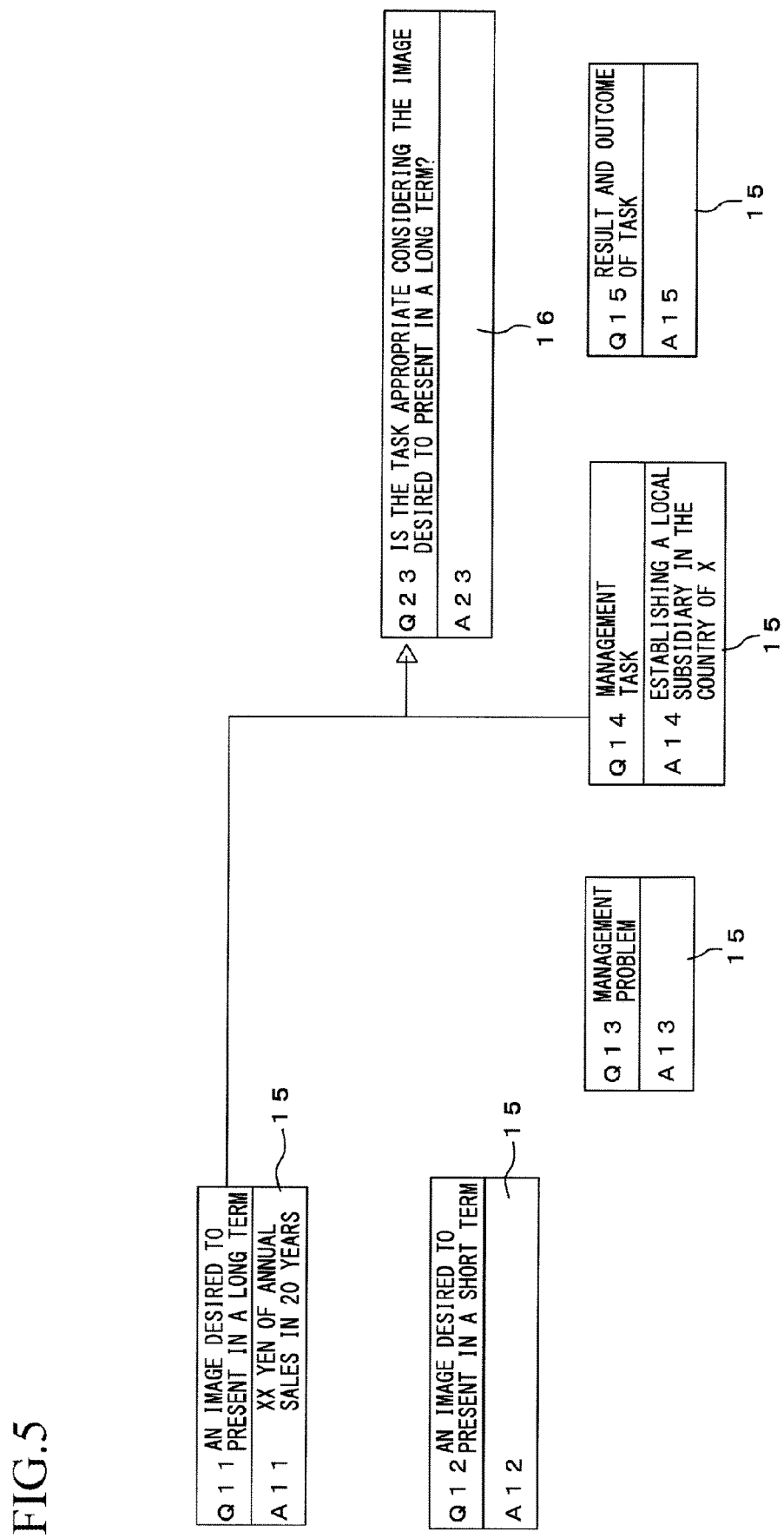
FIG. 5 is an explanatory diagram of a second question item displayed on the display unit according to the first embodiment.

When it is determined in step S106 that an unanswered second question item Q2 corresponding to the at least two pieces of input first answer data A1 is present, the control unit 30 displays the corresponding second question item Q2 on the display unit 20 (step S108: see FIG. 5).

In the example in FIG. 5, when "XX yen of annual sales in 20 years" is input as the first answer data A11 corresponding to Q11 "the image desired to present in a long term" and "establishing a local subsidiary in the country of X" is input as first answer data A14 corresponding to Q14 "the management task desired to be performed by the manager", the second question item of Q23 "whether the task is appropriate considering the image desired to present in a long term" in association with Q11 and Q14 is displayed on the display unit 20.

Although an example in which a corresponding input field 16 of second answer data A23 is provided at a position adjacent to the second question item Q23 is illustrated in FIG. 5, the corresponding input field 16 of the second answer data A23 may be provided anywhere in the display unit 20. However, by providing the corresponding input field 16 of the second answer data A2 at a position adjacent to the corresponding second question item Q2, the user (information gathering person) can easily tell to which question item an answer corresponds.

When it is determined in step S106 that no unanswered second question item Q2 for at least two pieces of input first answer data A1 is present, the control unit 30 returns to step S102 and continuously displays only the first question item Q1 on the display unit 20 until the next piece of first answer data A1 is input.

In the embodiment, since the second question items Q21 to Q210 are set for all the combinations of the five first question items Q11 to Q15, a case where the control unit 30 determines in step S106 that no second question item Q2 is present for at least two pieces of input first answer data A1 does not occur. When the second question item is not set for all the combinations of the first question items, the case where the control unit 30 determines in step S106 that no second question item Q2 is present for at least two pieces of input first answer data A1 occurs.

The control unit 30 stores the second answer data A2, which is input from the input reception unit 10 into the input field 16, in the storage unit 40 (step S110).

Even when the second question item Q2 is displayed on the display unit 20, an answer to an unanswered first question item Q1 may be given. In this case, in step S110, the control unit 30 stores the first answer data A1, which is input from the input reception unit 10 into the input field 15, in the storage unit 40.

Figure 6:
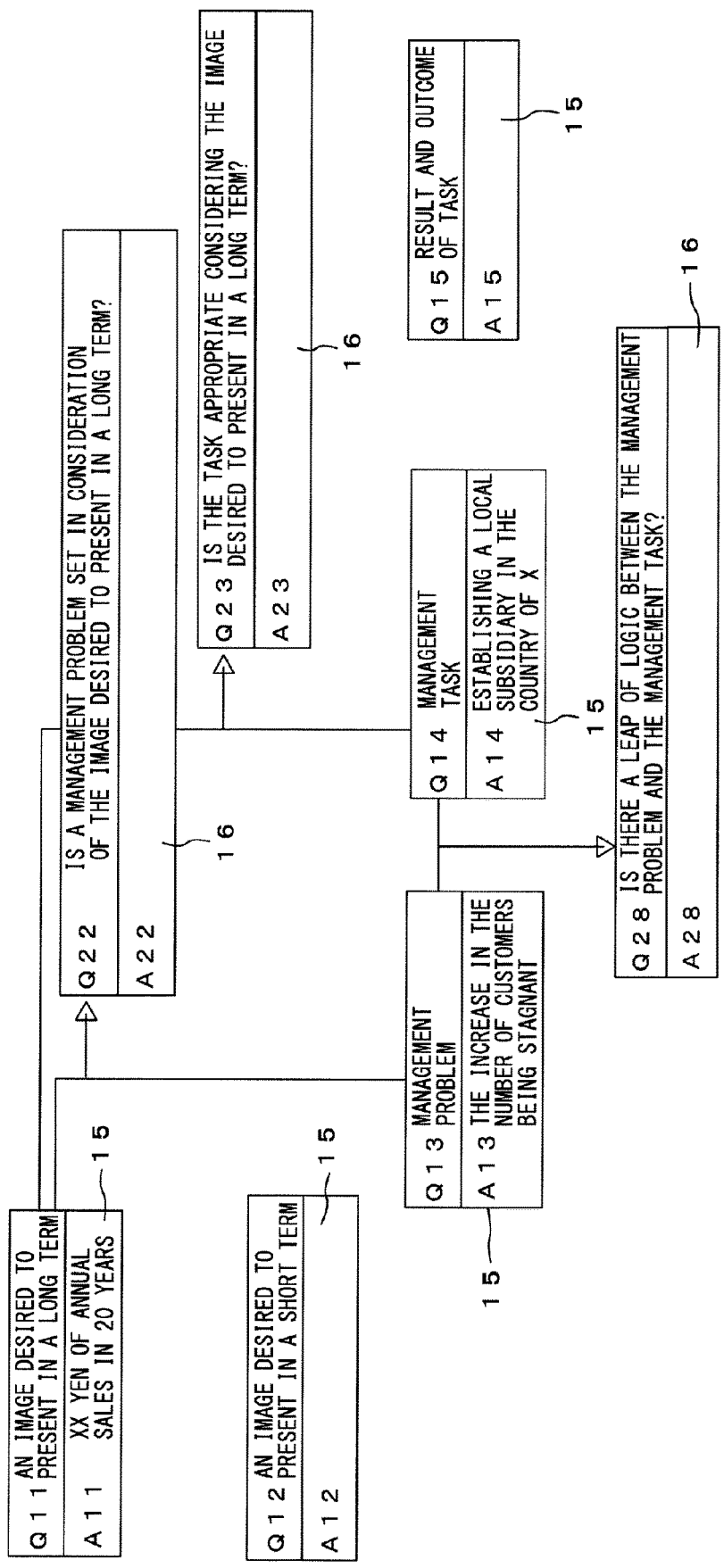
FIG. 6 is an explanatory diagram in a case where the second question item is further displayed following FIG. 5.

For example, FIG. 6 shows a state in which first answer data A13 "the increase in the number of customers being stagnant" for Q13 "the management problem perceived by the manager" is further input from the state in FIG. 5.

At this time, the control unit 30 determines whether a second question item Q2 is present for the first question item Q13 "the management problem perceived by the manager" corresponding to the newly input first answer data A13 and another first question item Q1 already answered in the storage unit 40.

As a result, the second question item Q22 "whether a management problem is set in consideration of the image desired to present in a long term" is present in the relationship between Q13 "the management problem perceived by the manager" and Q11 "the image desired to present in a long term", and the second question item Q28 "whether there is a leap of logic between the problem and the task" is present in the relationship between Q13 "the management problem perceived by the manager" and Q14 "the management task desired to be performed by the manager".

Therefore, the control unit 30 displays, on the display unit 20, the second question item Q22 "whether a management problem is set in consideration of the image desired to present in a long term" and Q28 "whether there is a leap of logic between the problem and the task".

In step S112, the control unit 30 determines whether the first answer data A1 for all the first question items Q1 and the second answer data A2 for all the second question items Q2 are input, and when there is answer data that is not input, repeats steps S110 to S112 until all answer data is stored in the storage unit 40.

Even when an answer is input for the answered first question item Q1 and answered second question item Q2, the control unit 30 performs control such that the answered first question item Q1 and answered second question item Q2 are continuously displayed together with the input first answer data A1 and second answer data A2.

In this way, the user (information gathering person) can arrange a way of asking question items with respect to the unanswered first question item Q1 or the unanswered second question item Q2 with reference to each piece of answer data that is input.

However, the control unit 30 may not continuously display the answered first question item Q1 and the answered second question item Q2.

In order to distinguish an answered question item from an unanswered question item, the control unit 30 may display the answered question item and the unanswered question item in different colors or display "answered" near the answered question item.

When the first answer data A1 for all the first question items Q1 and the second answer data A2 for all the second question items Q2 are input, the control unit 30 confirms whether all answer data for the question items is stored, and ends the operations according to the embodiment when all the answer data is stored.

Figure 7:
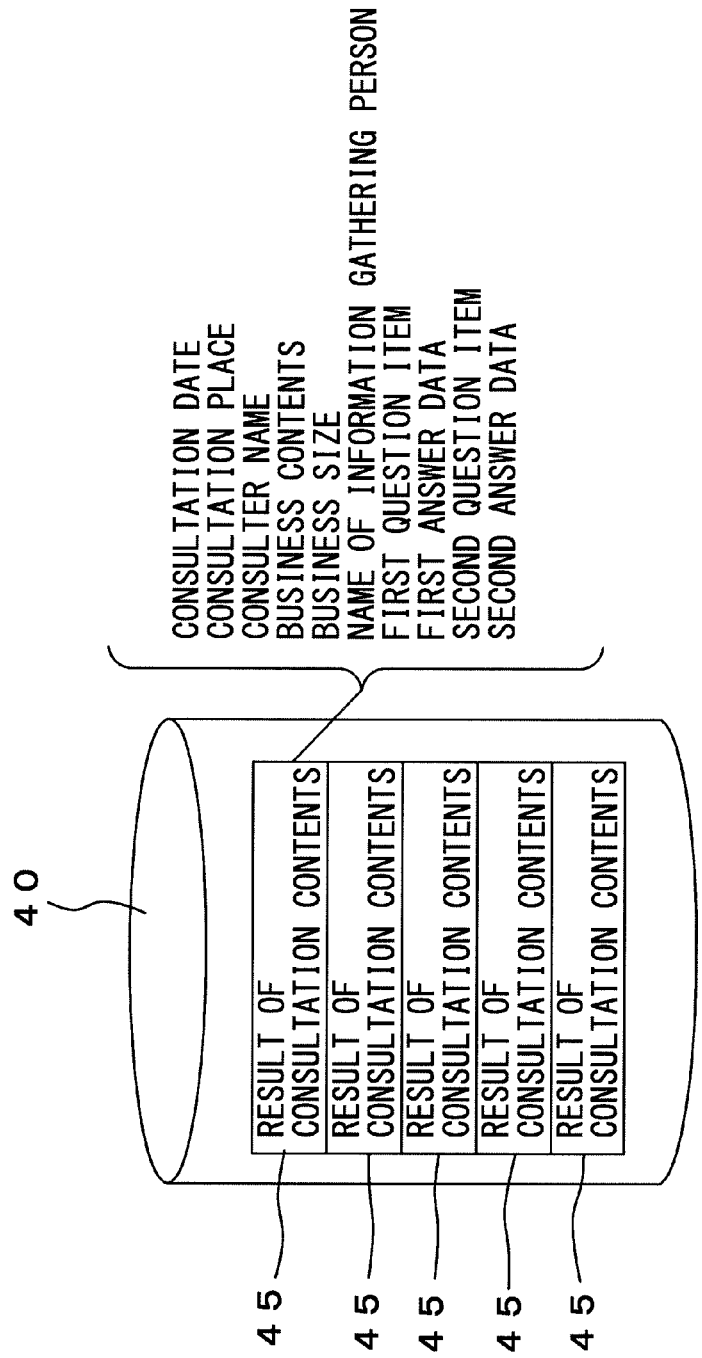
FIG. 7 is an explanatory diagram of result data stored in a storage unit according to the first embodiment.

The control unit 30 creates a database for result data 45 of consultation contents for each consultation in the storage unit 40 (see FIG. 7).

The contents of the result data 45 at least include a consultation date, a consultation place (a name of the chamber of commerce and industry), a name of the consulter, a name of the information gathering person, the first question item Q1 and the first answer data A1 corresponding thereto, the second question item Q2 and the second answer data A2 corresponding thereto. Further, a business field, a business size, and the like of the consulter may be included.

Items other than the first question item Q1, the first answer data A1 corresponding to the first question item Q1, the second question item Q2, and the second answer data A2 corresponding to the second question item Q2 may be input at the start of the consultation or separately input after the start of the consultation.

In this way, by creating a database for the consultation contents for each consultation, when the same consulter newly comes for a consultation, the past consultation contents can be referred to. Accordingly, the consultation can be advanced smoothly, and from the consulter's perspective, it also provides an opportunity to review previously established management policies or the like.

After the consultation, the control unit 30 can perform control to output the result data 45 of the consultation contents, for which a database is created, from a printer 42 at the request of the user (information gathering person) or the consulter.

As described above, since the five first question items Q11 to Q15 are assigned with respective priorities and are stored in advance in the storage unit 40, when outputting the contents of the database from the printer 42, the control unit 30 can print the plurality of first question items Q1 and the first answer data corresponding thereto in an easy-to-understand order.

Since the priorities of the five first question items Q11 to Q15 can be changed at any timing, it is possible to determine which of the question items is important (which has a higher priority) in the consultation and to print the question item and the answer data corresponding thereto in an order of priority according to the consulter.

In addition, by setting the priorities of the five first question items Q11 to Q15 in advance and changing the priorities at any timing, the control unit 30 can also determine priorities of the second question items Q21 to Q210 based on the priorities. That is, since the second question item is set based on a relationship between two first question items, the second question item including a first question item having a higher priority is displayed in a prioritized order.

For example, when Q23 and Q26 are compared, since Q23 corresponds to Q11 and Q14 and Q26 corresponds to Q12 and Q14, the control unit 30 determines that Q23 including Q11 having a higher priority has a higher priority than Q26.

For example, when Q22 and Q24 are compared, since Q22 corresponds to Q11 and Q13 and Q24 corresponds to Q11 and Q15, Q11 is common. Therefore, in this example, the control unit 30 compares the remaining Q13 and Q15, and determines that Q22 including Q13 having a higher priority has a higher priority than Q24.

In this way, when outputting the result data 45 of the consultation contents from the printer 42, the control unit 30 can print not only a plurality of first question items Q1 and the first answer data corresponding to the first question items Q1 but also a plurality of second question items and the second answer data corresponding to the second question items in an easy-to-understand order or an order of priority according to the consulter in accordance with the priorities of the first question items.

The printed matter output in this manner is obtained by organizing confused thoughts of the consulter by the information processing system S1. When describing matters related to management to other parties such as an interested party and a financial institution, the consulter can easily and clearly perform the description to other parties by presenting the printed matter organized by the information processing system S1.

According to the information processing system S1 and the information processing program PGM1 of the embodiment described above, as soon as predetermined two pieces of first answer data is input, a corresponding second question item is displayed and an input of second answer data is received. Accordingly, even when a hearing skill of an information gathering party is not sufficient, a hearing can be conducted without the information gathering party getting confused about the order in information gathering. Further, each answer can be input without omission.

In addition, since the user (information gathering person) conducts the consultation by using the information processing system S1, a skill for serving as the information gathering person can be improved. When the skill for serving as the information gathering person is improved, understanding of a mechanism of thinking is advanced, and thus companion support for the consulter is facilitated.

Second Embodiment

Next, an information processing system and an information processing program according to a second embodiment will be described.

Since a system configuration is the same as that of the first embodiment, a drawing of the system configuration is omitted.

The second embodiment is a mode in which an additional answer item is further generated from a consulter. This is because the consulter in this embodiment is assumed to be a company manager, and there are many cases in which the consulter wants to talk about future visions, tasks, and the like.

Figure 8:
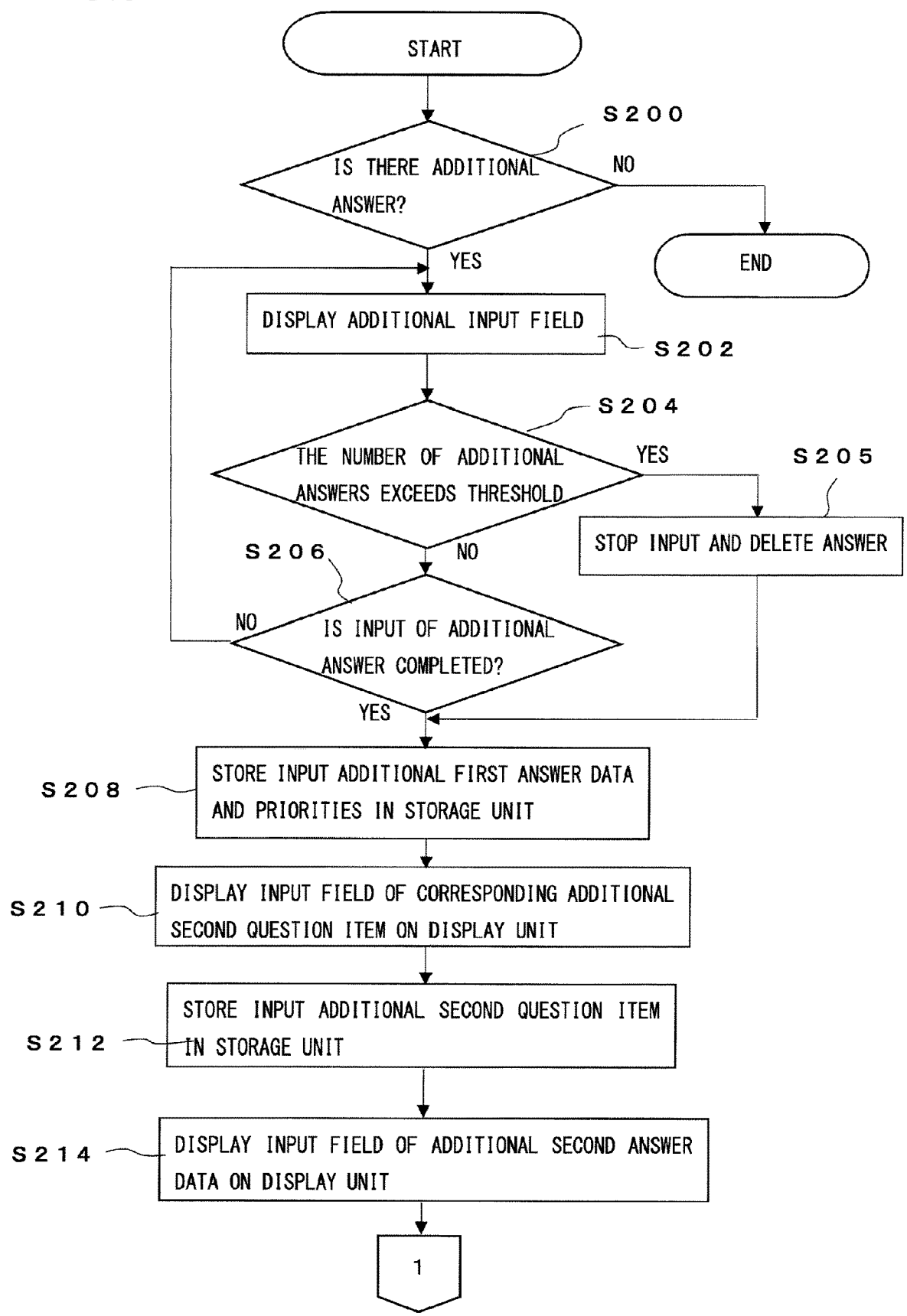
FIG. 8 is a flowchart of information processing according to a second embodiment.
Figure 9:
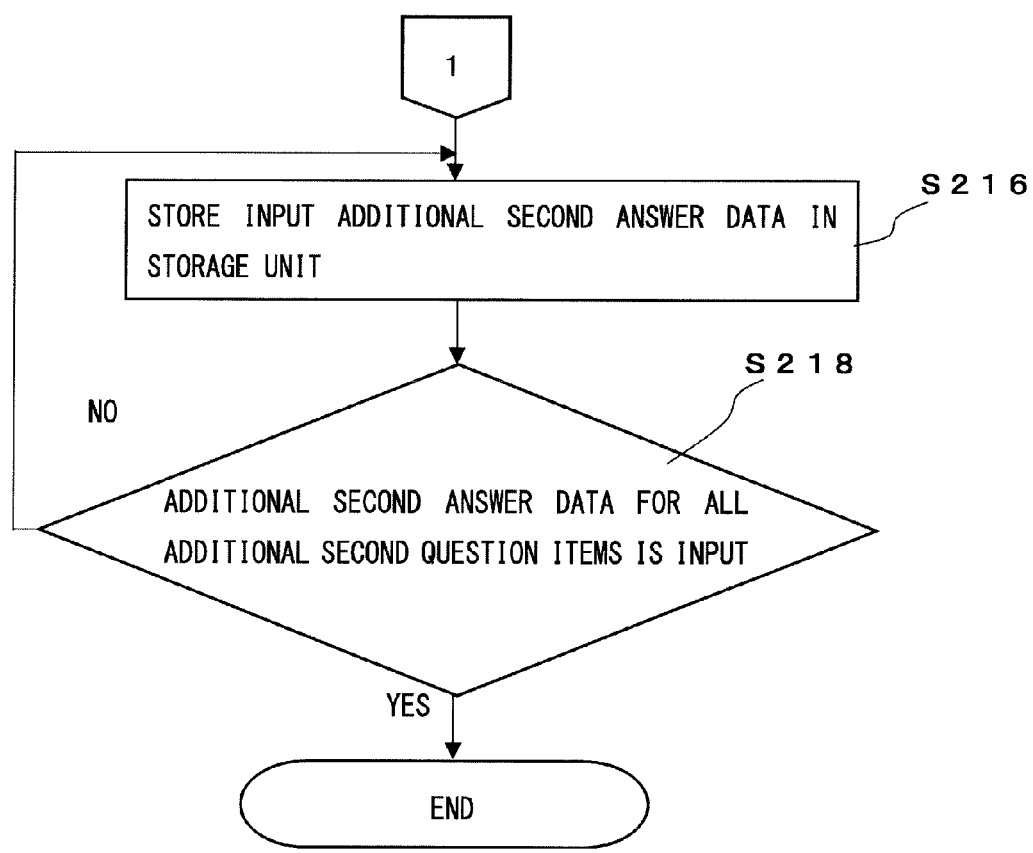
FIG. 9 is a flowchart continued from FIG. 8.

FIGS. 8 and 9 show a flowchart of the second embodiment.

Figure 3:
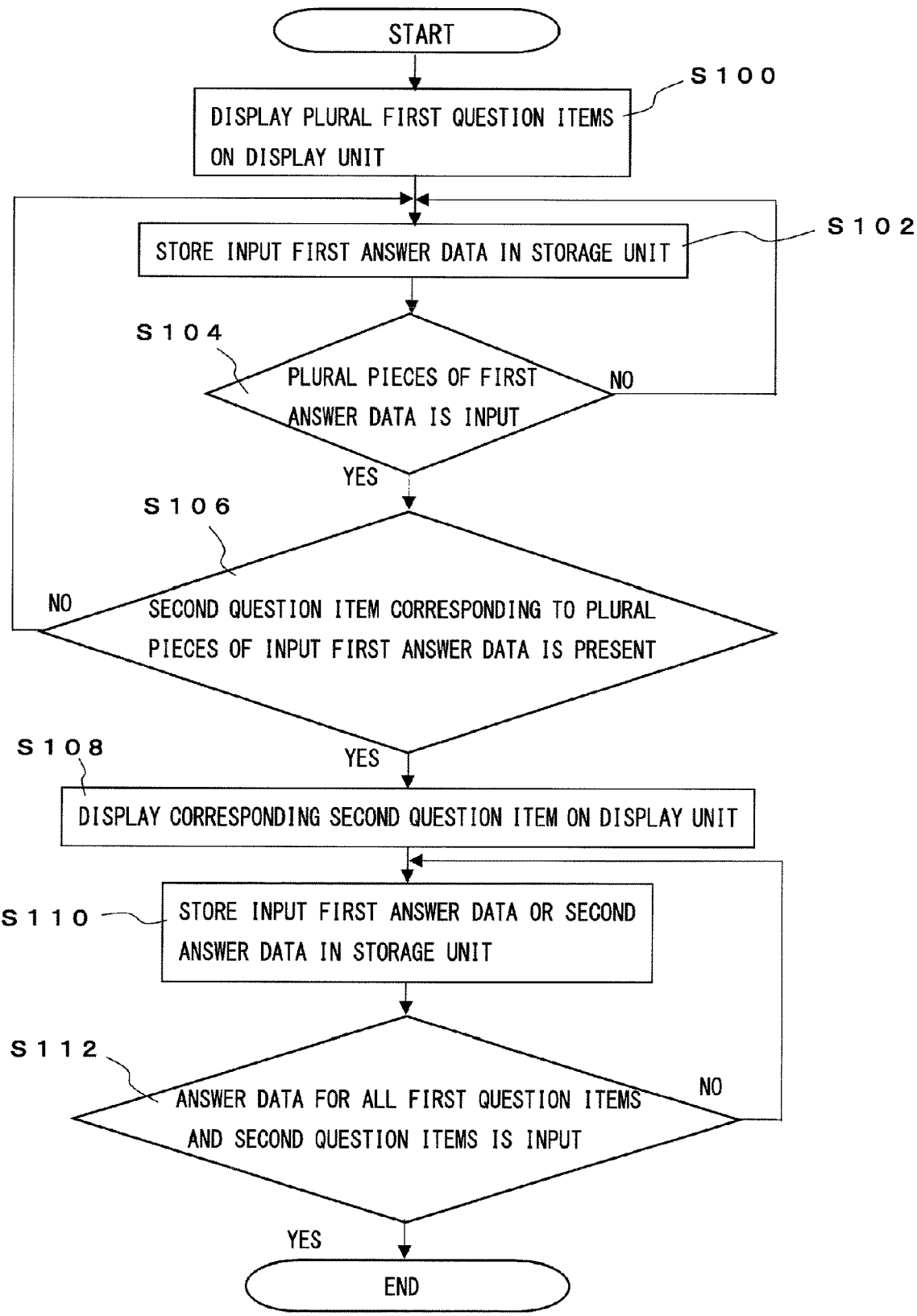
FIG. 3 is a flowchart of information processing according to the first embodiment.

FIGS. 8 and 9 are continuation of the flowchart in FIG. 3.

In step S200, after the first answer data A1 for all the first question items Q1 and the second answer data A2 for all the second question items Q2 are input, the control unit 30 causes the display unit 20 to display whether there is additional answer data. Specifically, the control unit 30 causes the display unit 20 to display a button of "additional answer data present" and a button of "additional answer data absent" (not shown).

When the user (information gathering person) gathers information indicating that there is no additional answer from the consulter, the user (information gathering person) presses the button of "additional answer data absent", and the control unit 30 suspends the operations, stores the answer data input up to this point in the storage unit 40, and then enters a standby state. In the standby state, the control unit 30 controls the display unit 20 to continuously display the button of "additional answer data present" and the button of "additional answer data absent".

When the user (information gathering person) gathers information indicating that an additional answer is present from the consulter, the user (information gathering person) presses the button of "additional answer data present".

Upon detecting that the button of "additional answer data present" is pressed, the control unit 30 causes the display unit 20 to display an input field for the additional answer data (step S202).

The control unit 30 also causes the display unit 20 to display an input completion button (not shown).

Figure 10:
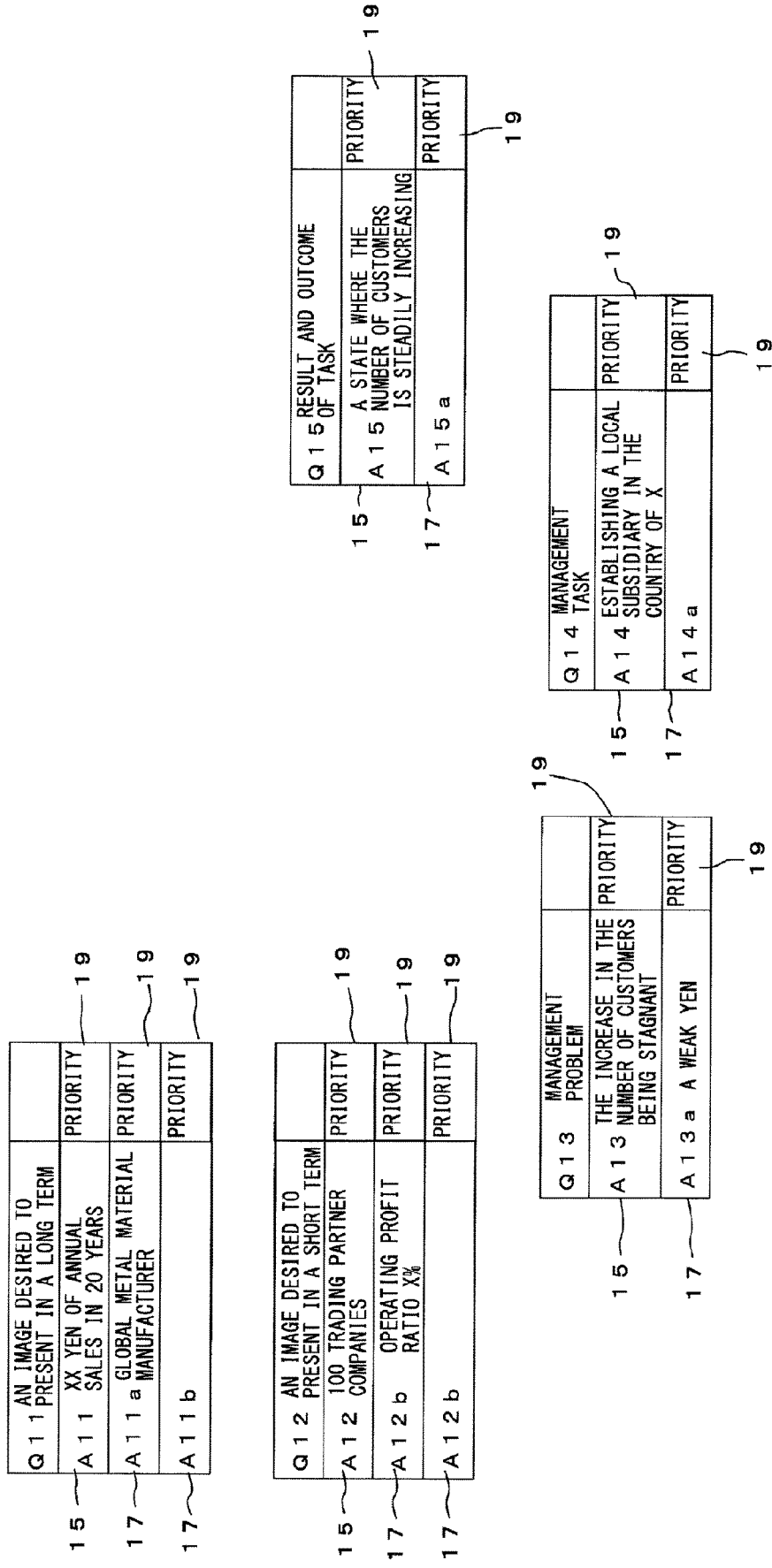
FIG. 10 is an explanatory diagram of an input field of additional first answer data displayed on a display unit according to the second embodiment.

FIG. 10 illustrates a display example of an input field for additional answer data.

Here, the control unit 30 provides one or a plurality of input fields 17 for the additional answer data adjacently to each input field 15 of the first answer data A11 to A15 that are already input. Here, an additional answer is assumed as additional first answer data distributed as an answer to any one of the five first question items Q11 to Q15 already asked.

In addition, regarding the additional answer from the consulter, it may be unclear to which question item the answer corresponds. For this reason, the user (information gathering person) determines to which question of the five first question items Q11 to Q15 the answer from the consulter corresponds, and inputs the answer as the additional first answer data into the input field of the additional answer data corresponding to the first question item.

For example, as illustrated in FIG. 10, in a case where, as the additional first answer data, the consulter provides answers such as "desiring to become a global metal material manufacturer", "operating profit ratio X %", and "a weak yen being the problem", the user (information gathering person) determines that the answers are answers to the first question items of "the image desired to present in a long term", "the image desired to present in a short term", and "the management problem perceived by the manager", respectively, and the user (information gathering person) inputs the additional first answer data into the input fields 17 corresponding to the first question items Q11 to Q13.

However, which one of the first question items Q11 to Q15 the additional first answer data corresponds to may be determined not by the user (information gathering person) but by the consulter, or may be discussed and determined by the user (information gathering person) and the consulter.

As illustrated in FIG. 10, the control unit 30 displays a priority input field 19 for inputting a priority at the input field 17 of the additional first answer data and at the input field 15 of the first answer data that is already input. The priority is used to determine the order of outputting a plurality of pieces of first answer data in the same first question item when outputting the first answer data A1 for all the first question items Q1 and the second answer data A2 for all the second question items Q2 stored in the storage unit 40 later from the printer 42.

The control unit 30 may set a threshold of the number of inputs of the additional first answer data in advance. For example, a threshold can be set for the number of pieces of additional first answer data with respect to each first question item Q1, or for the total number of pieces of additional first answer data with respect to all first question items Q1.

In a case where a threshold of the number of pieces of additional first answer data for each first question item Q1 is set, when the number of pieces of additional first answer data for any one of the first question items Q1 exceeds the threshold (step S204), the control unit 30 causes the display unit 20 to display input stop and a message prompting deletion of any piece of the input additional first answer data (step S205).

A case is conceivable where the threshold of the number of inputs of the additional first answer data is not necessary depending on thinking ability of the consulter and a method of using the information processing system S1, and thus the threshold of the number of inputs of the additional first answer data may not be set.

In a case where a threshold is set for the total number of pieces of additional first answer data for all the first question items Q1, when the number of pieces of all the additional first answer data exceeds the threshold (step S204), the control unit 30 causes the display unit 20 to display the input stop and the message prompting deletion of any piece of the input additional first answer data When the user (information gathering person) stops the input and deletes any piece of the additional first answer data after the number of pieces of additional first answer data for each first question item Q1 or the total number of pieces of additional first answer data for all the first question items Q1 exceeds the threshold, since the input completion button (not shown) is pressed (step S206), the control unit 30 continues the operations.

When the user (information gathering person) presses the input completion button (not shown) (step S206) after all the additional first answer data and the priorities are input, the control unit 30 associates the additional first answer data with the first answer data A1 that is already input, both of which are corresponding to the same first question item Q1, and stores the additional first answer data and the input first answer data A1 in accordance with priorities thereof in the storage unit 40 (step S208).

Figure 11:
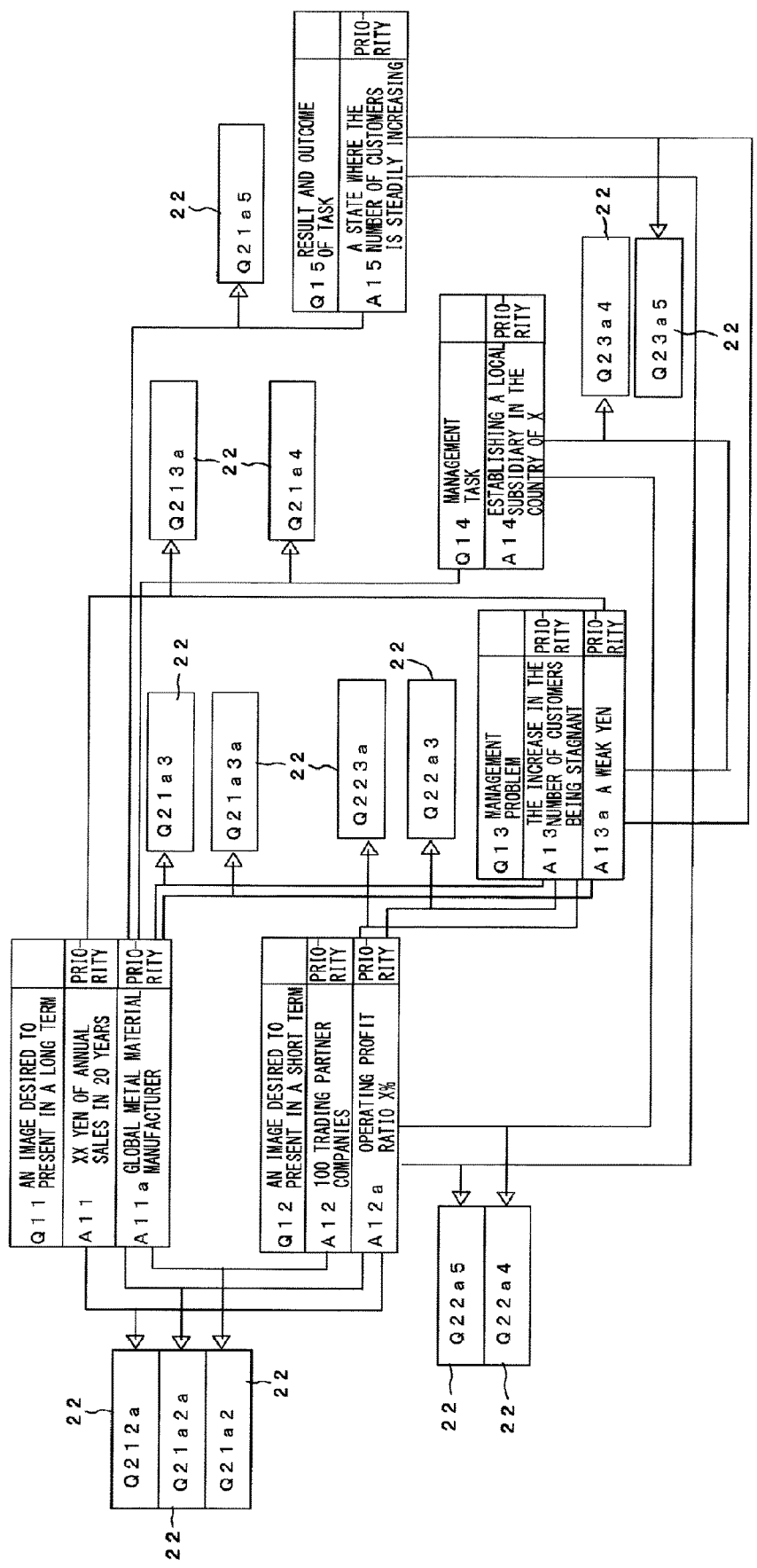
FIG. 11 is an explanatory diagram of an input field of an additional second question item displayed on the display unit according to the second embodiment.

Next, as illustrated in FIG. 11, the control unit 30 displays an input field 22 for inputting an additional second question item, between the additional first answer data and the already input first answer data and between the additional first answer data (step S210).

In the example illustrated in FIG. 11, in a case where additional first answer data A11a "desiring to become a global metal material manufacturer" corresponding to the first question item Q11, additional first answer data A12a "operating profit ratio X %" corresponding to the first question item Q12, and additional first answer data A13a "a weak yen being the problem" corresponding to the first question item Q13 are input as the additional first answer data, the input fields 22 of additional second question items generated between the additional first answer data A11a to A13a and the input fields 22 of additional second question items generated between the additional first answer data A11a to A13a and the already input first answer data A11 to A15 are displayed.

Specifically, with respect to the additional first answer data A11a "desiring to become a global metal material manufacturer", the input field 22 of an additional second question item Q21a2 generated with already input first answer data A12 "100 trading partner companies", the input field 22 of an additional second question item Q21a3 generated with the already input first answer data A13 "the increase in the number of customers being stagnant", the input field 22 of an additional second question item Q21a4 generated with the already input first answer data A14 "establishing a local subsidiary in the country of X", the input field 22 of an additional second question item Q21a5 generated with already input first answer data A15 "a state where the number of customers is steadily increasing", the input field 22 of an additional second question item Q21a2a generated with the additional first answer data A12a "operating profit ratio X %", and the input field 22 of an additional second question item Q21a3a generated with the additional first answer data A13a "a weak yen being the problem" are displayed on the display unit 20.

Although not all additional second question items are described here, just by adding one piece of additional first answer data to any first question item Q1, an increase of at least four additional second question items is obtained. Therefore, as additional first answer data is added, a huge number of question items and corresponding answer data are set as a whole.

If there are too many question items, the user (information gathering person) may be confused about what to ask and the consulter may be confused about what to answer. Therefore, as described above, a threshold may be provided for the number of inputs of the additional first answer data, and control may be performed so that not too much additional first answer data is input.

However, in a case where there are a plurality of users (information gathering persons) and a plurality of consulters, when organizing confused thoughts, it is possible to compensate for the processing capacity of the users (information gathering persons) and the consulters by handling a large number of question items through dividing the large number of question items into ranges, and thus it is not necessary to provide a threshold for the number of inputs of the additional first answer data. After an input field of an additional second question item is displayed on the display unit 20, the user (information gathering person) inputs an additional second question item into the corresponding input field.

Then, the control unit 30 stores the input additional second question item in the storage unit 40 (step S212).

Subsequently, the control unit 30 causes the display unit 20 to display an input field for inputting additional second answer data that is an answer to the additional second question item (not illustrated: step S214).

Since an additional second question item occurs at any time, it may be difficult for the user (information gathering person) to discuss and input a question item.

Therefore, the user (information gathering person) may create a sample text of the additional second question item in advance and store the sample text in the storage unit 40, and the control unit 30 may extract and arrange the sample text when the additional first answer data is input and display the sample text on the display unit 20. A producer or a constructor of the system may create a sample text and store the sample text in the storage unit 40 when the system is completed.

As the sample text, for example, contents "Please explain in detail the relationship between the answer of "XX" and the answer of "YY", providing numerical basis or the like" are exemplified. In this case, the control unit 30 generates an additional second question item by inserting the number of an input field of additional first answer data input most recently and the number of an input field of already input first answer data into the "XX" portion and "YY" portion and making an arrangement.

Every time the additional second answer data, which is an answer to the additional second question item, is input, the control unit 30 stores the additional second answer data in the storage unit 40 (step S216).

When input of all additional second answer data is completed, the control unit 30 confirms whether all answer data is stored for each question item, and when all answer data is stored, the control unit 30 ends the operations of the embodiment (step S218).

Figure 12:
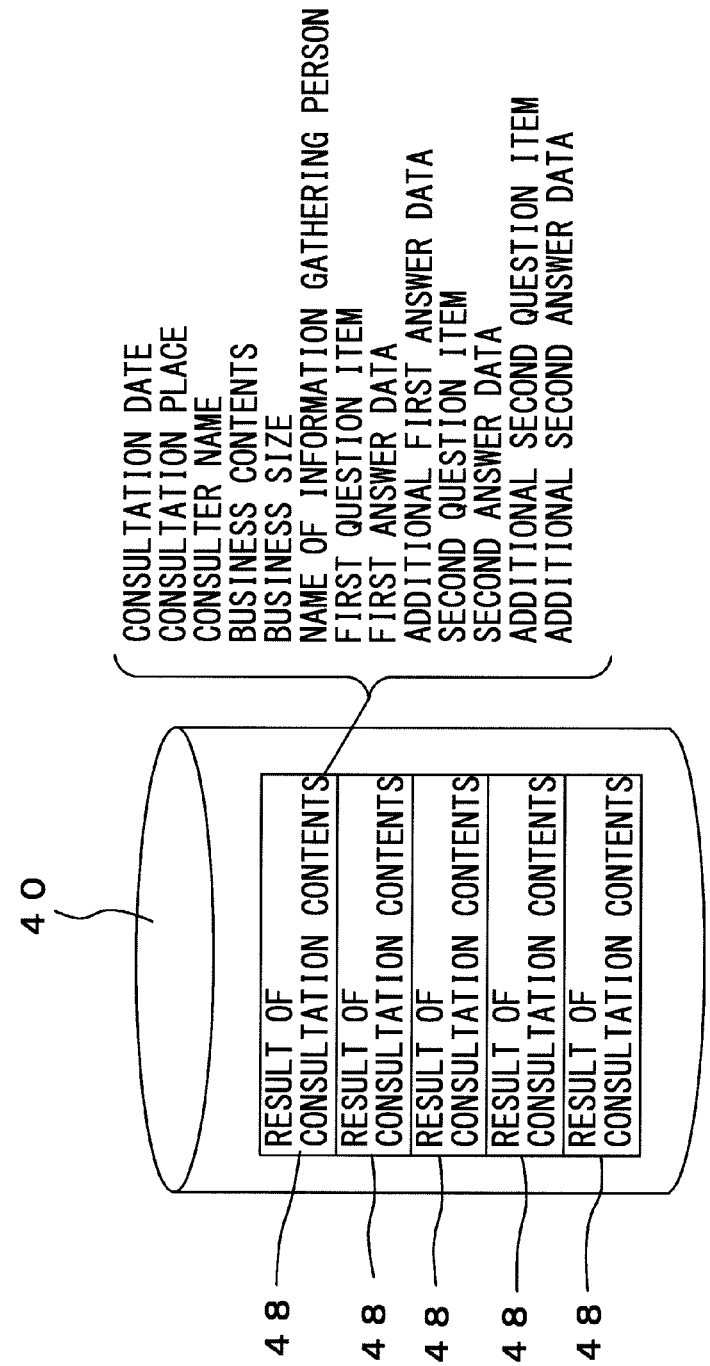
FIG. 12 is an explanatory diagram of result data stored in a storage unit according to the second embodiment.

Also in this embodiment, the control unit 30 creates a database for result data 48 of consultation contents for each consultation in the storage unit 40 (see FIG. 12).

The contents of the result data 48 at least include a consultation date, a consultation place (a name of the chamber of commerce and industry), a name of the consulter, a name of the information gathering person, the first question item Q1 and the first answer data A1 corresponding thereto, the additional first answer data, the second question item Q2 and the second answer data A2 corresponding thereto, and the additional second question item and the additional second answer data corresponding thereto. Further, a business field, a business size, and the like of the consulter may be included.

In this way, by creating a database for the consultation contents for each consultation, when the same consulter newly comes for a consultation, the past consultation contents can be referred to. Accordingly, the consultation can be advanced smoothly, and from the consulter's perspective, it also provides an opportunity to review previously established management policies or the like and to review the result of having the confusion of thoughts resolved.

After the consultation, the control unit 30 can perform control to output the result data 48 of the consultation contents, for which a database is created, from the printer 42 at the request of the user (information gathering person) or the consulter.

As described above, the five first question items Q11 to Q15 are assigned with respective priorities and are stored in advance in the storage unit 40, and in the embodiment, priorities of the additional first answer data and the first answer data are determined in the same first question item Q1. Accordingly, the second question item and the second answer data corresponding thereto and the additional second question item and the additional second answer data can also be printed in an easy-to-understand order.

That is, since the second question item and the additional second question item are set based on the relationship between the first answer data, the relationship between the first answer data and the additional answer data, or the relationship between the additional answer data, the priorities of the first answer data and the additional answer data being already determined, the second question item including the first answer data or the additional first answer data having a high priority and the second answer data that is an answer thereto, and the additional second question item including the first answer data or the additional first answer data having a high priority and the additional second answer data that is an answer thereto are printed in a prioritized order.

Further, as described in the first embodiment, the priorities of the five first question items Q11 to Q15 may be changed at any timing, and the priorities of the additional first answer data and the first answer data in the same first question item Q1 in the embodiment may also be changed at any timing.

Specifically, the control unit 30 performs control of causing the display unit 20 to constantly display an additional answer data priority change field (not shown), and when a changed priority is input into the additional answer data priority change field, causing the storage unit 40 to store change data of the input priority.

In this way, by making it possible to change the priorities of the additional first answer data and the first answer data at any timing, for example, when printing and outputting the additional first answer data and the first answer data from the printer 42, it is possible to newly determine which piece of the additional first answer data and the first answer data is important (which has a higher priority), and to print the additional first answer data and the first answer data in an order of priority according to the consulter.

Third Embodiment

In the embodiment, a case where an information processing system and an information processing program of the invention are applied to creation of a business plan for subsidy application will be described.

At present, there are many types of subsidies for supporting small and medium enterprises in a country and self-governing bodies. Since public offering of a subsidy is suddenly announced, it is difficult for managers of small and medium enterprises to prepare in advance, and there are often difficulties in creating a business plan for application because a period from the announcement to the application deadline is short.

On the other hand, the examination of business plans for subsidy application focuses on whether examination items set in advance by the country or the self-governing bodies are reflected in the business plan. Therefore, it is necessary to definitely read the examination items and reflect the examination items in the business plan, but it is extremely difficult to create a business plan, in which the examination items are definitely reflected, in a short period.

Therefore, by applying the information processing system S1 to creation of a business plan for subsidy application, the business plan, in which the examination items are definitely reflected, can be created in a short period.

Hereinafter, the information processing system S1 applied to creation of a business plan for subsidy application will be described.

Figure 13:
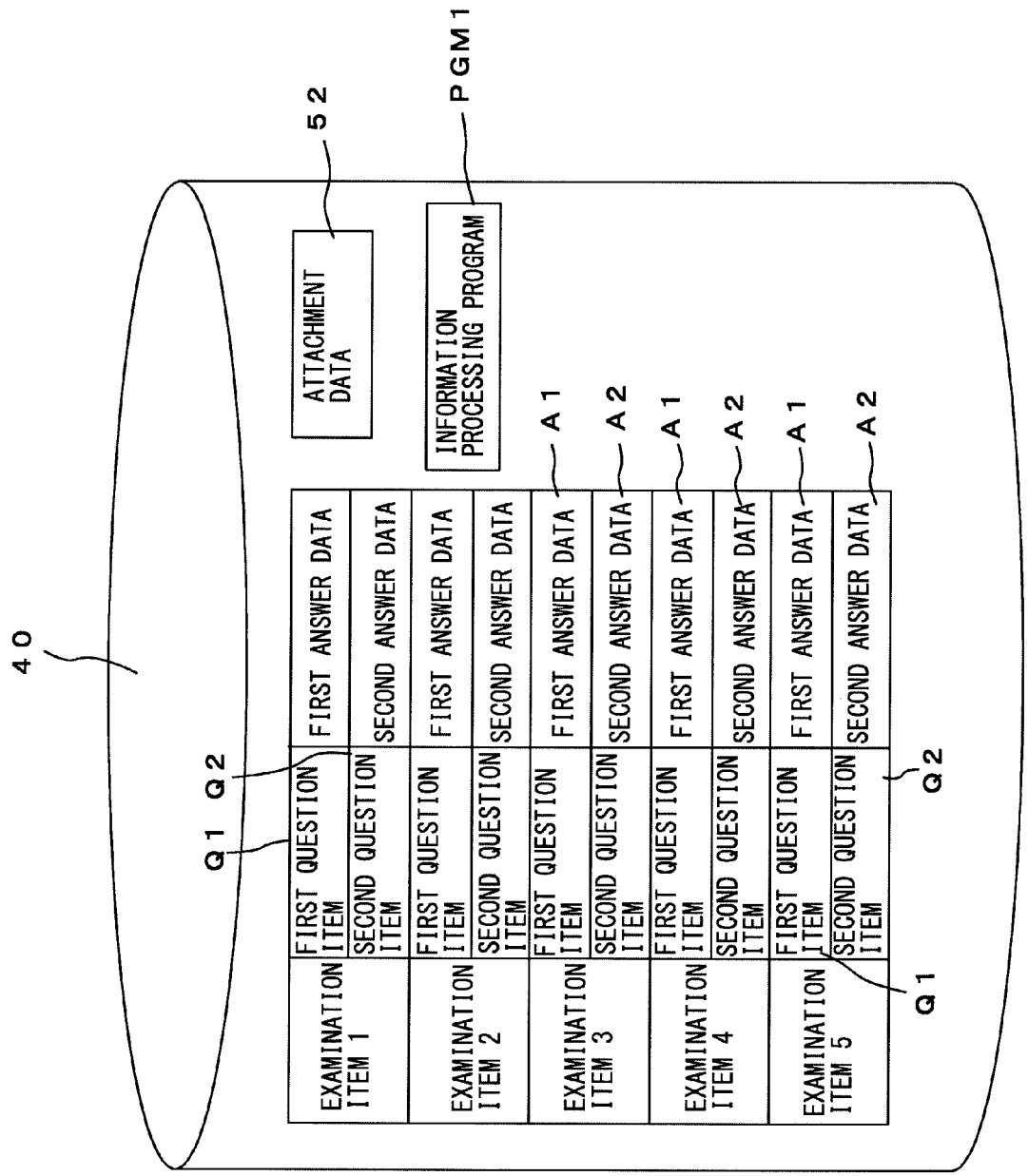
FIG. 13 is an explanatory diagram of a storage unit according to a third embodiment.

FIG. 13 illustrates a configuration in the storage unit 40 in the information processing system S1 according to the embodiment. Other components of the information processing system S1 are the same as those of the above-described embodiments, and a description thereof is omitted.

The storage unit 40 of the information processing system S1 according to the embodiment stores the first question item Q1 and the second question item Q2 corresponding to each of a plurality of examination items in the subsidy application. The first answer data A1 corresponding to the first question item Q1 and the second answer data A2 corresponding to the second question item Q2 in each of the plurality of examination items are also stored after the answers are input.

Although an example in which there are five examination items is illustrated in FIG. 13, the number of examination items varies depending on the type of the subsidy, and the number of examination items is not limited to five.

The storage unit 40 can also store attachment data 52 as a supplementary material to be attached to the business plan for subsidy application. The attachment data 52 is data used for making contents of the business plan for subsidy application persuasive, and includes investigation data obtained through investigations conducted by the small and medium enterprises themselves, data published by a public institution, and the like. Specific examples thereof include diagrams, graphs, and tables. The data may be in an image file format or a file format of spreadsheet software or word processing software.

The attachment data 52 may be data created in the control device 50 or data created by another computer or the like and fetched and stored in the storage unit 40.

The control unit 30 causes the display unit 20 to display an input field (not shown) for allowing a user (an information gathering person) or a consulter to input which of the first answer data A1 and/or the second answer data A2 is to be associated with the attachment data 52 as the supplementary material.

The control unit 30 stores the attachment data 52 in the storage unit 40 in association with any of the first answer data A1 and/or the second answer data A2 based on contents input into the input field.

In the case where the information processing system S1 is applied to the creation of a business plan for subsidy application, the user (information gathering person) may set the first question item Q1 and the second question item Q2 as in the above-described embodiments, or the consulter (a manager who wants to apply for the subsidy) and the user (information gathering person) may set the first question item Q1 and the second question item Q2 by discussion. Hereinafter, a case will be described in which the user (information gathering person) sets the first question item Q1 and the second question item Q2.

Figure 14:
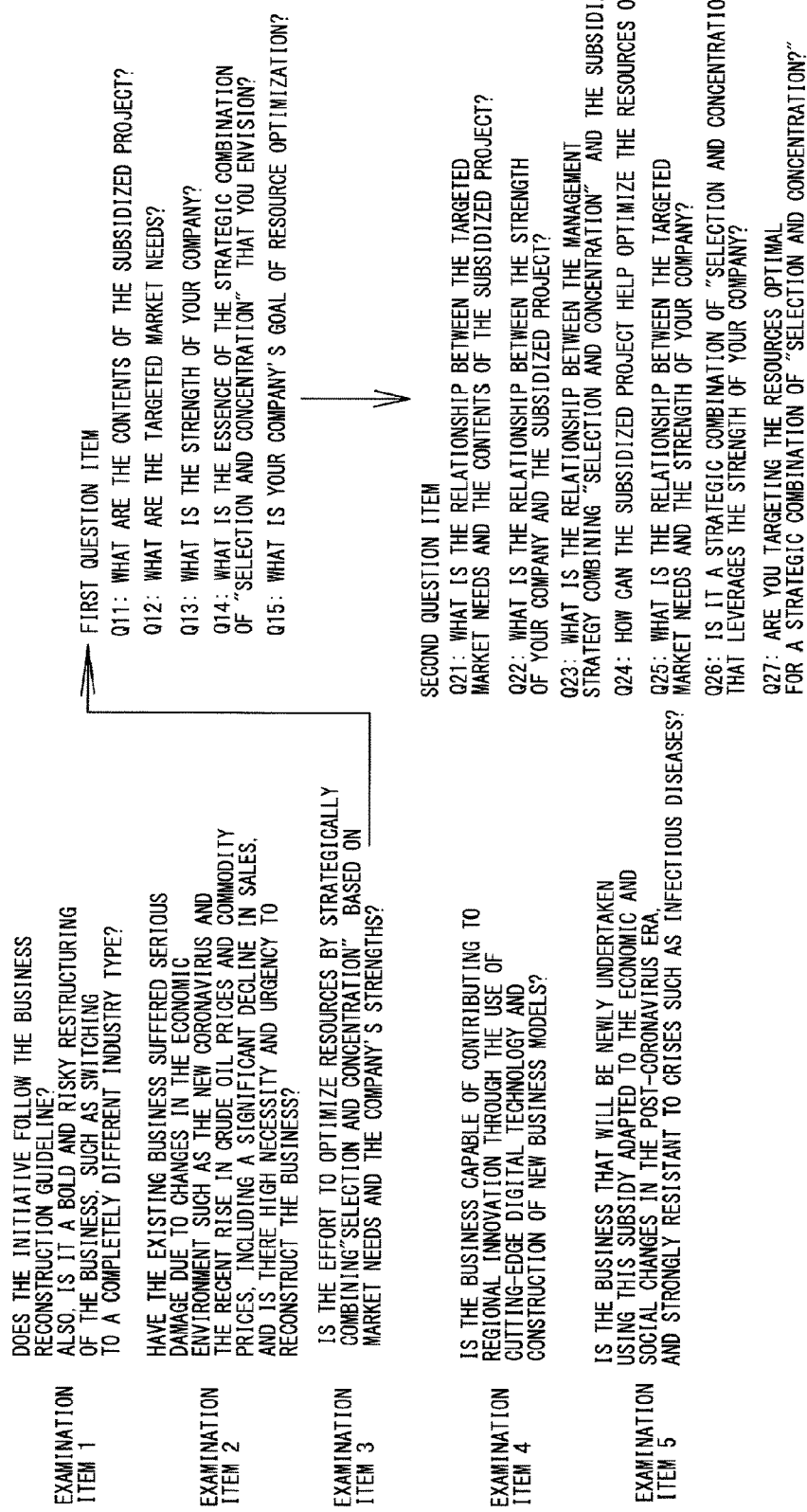
FIG. 14 is an explanatory diagram illustrating a relationship between examination items, first question items, and second question items according to the third embodiment.

FIG. 14 illustrates an outline of the first question item Q1 and the second question item Q2 in the case where the information processing system S1 is applied to the creation of a business plan for subsidy application.

In FIG. 14, examination items for a business reconstruction subsidy are exemplified. For example, an examination item 1 reads "Does the initiative follow the business reconstruction guideline? Also, is it a bold and risky restructuring of the business, such as switching to a completely different industry type?" An examination item 2 reads "Have the existing business suffered serious damage due to changes in the economic environment such as the new coronavirus and the recent rise in crude oil prices and commodity prices, including a significant decline in sales, and is there high necessity and urgency to reconstruct the business?" An examination item 3 reads "Is the effort to optimize resources by strategically combining 'selection and concentration' based on market needs and the company's strengths?" An examination item 4 reads "Is the business capable of contributing to regional innovation through the use of cutting-edge digital technology and construction of new business models?" An examination item 5 reads "Is the business that will be newly undertaken using this subsidy adapted to the economic and social changes in the post-coronavirus era, and strongly resistant to crises such as infectious diseases?"

As an example, a case where the first question item Q1 and the second question item Q2 are set with respect to the examination item 3 "Is the effort to optimize resources by strategically combining "selection and concentration" based on market needs and the company's strengths?" will be described.

The user (information gathering person) divides contents of the examination item 3 at places with punctuation marks or into segments with meaning, and sets the contents of the divided sentence as a plurality of first question items Q11 to Q15. Here, Q11 is a question about contents of a subsidized project as a premise, and Q11 is "What are the contents of the subsidized project?" In addition, the user (information gathering person) sets Q12 "What are the targeted market needs?" Q13 "What is the strength of your company?" Q14 "What is the essence of the strategic combination of 'selection and concentration' that you envision?", and Q15 "What is your company's goal of resource optimization?" as other first question items.

The user (information gathering person) stores the plurality of set first question items Q11 to Q15 in the storage unit 40.

Although five first question items Q11 to Q15 are set in the example in FIG. 14, the number of the first question items is not limited to five and can be freely set based on the contents of the examination item.

Next, the user (information gathering person) sets a plurality of second question items based on a relationship between a pair of first question items selected from the plurality of set first question items Q11 to Q15.

In the example illustrated in FIG. 14, Q21 "What is the relationship between the targeted market needs and the contents of the subsidized project?" based on a relationship between Q11 and Q12, Q22 "What is the relationship between the strength of your company and the subsidized project?" based on a relationship between Q11 and Q13, Q23 "What is the relationship between the management strategy combining selection and concentration and the subsidized project?" based on a relationship between Q11 and Q14, Q24 "How can the subsidized project help optimizing the resources of your company?" based on a relationship between Q11 and Q15, Q25 "What is the relationship between the targeted market needs and the strength of your company?" based on a relationship between Q12 and Q13, Q26 "Is it a strategic combination of 'selection and concentration' that leverages the strength of your company?" based on a relationship between Q13 and Q14, and Q27 "Are you targeting the resources optimal for a strategic combination of 'selection and concentration'?" based on a relationship between Q14 and Q15 are exemplified. The second question items exemplified here are not second question items set for all combinations of the first question items Q11 to Q15, but are a part thereof.

The user (information gathering person) stores the plurality of set second question items Q21 to Q27 in the storage unit 40.

The user (information gathering person) sets a plurality of first question items Q1 and a plurality of second question items Q2 for all examination items and stores the plurality of first question items Q1 and the plurality of second question items Q2 in the storage unit 40.

Although the contents of the examination item are set to the first question item in the above-described example, the contents of the examination item may be set to the second question item since the examination item is determined in various ways depending on the type of the subsidy.

Next, operations executed by the information processing program PGM1 according to the embodiment will be described. Basic operations are the same as those illustrated in FIG. 3, and thus a description thereof will be omitted here.

As operations unique to the embodiment, the information processing program PGM1 can change the contents of the first question item Q1 and the second question item Q2 at any timing, add the first question item Q1 and the second question item Q2, and delete the first question item Q1 and the second question item Q2.

The control unit 30, which reads the information processing program PGM1, causes the display unit 20 to display a question item change button (not shown) for prompting the user (information gathering person) to change, add, or delete the first question item Q1 and the second question item Q2 during the operations S100 to S112 in FIG. 3.

When the question item change button is pressed, the control unit 30 stops the currently executed operation and causes the display unit 20 to display a change display screen (not shown).

On the change display screen, the user (information gathering person) inputs a change or addition of the first question item Q1 and the second question item Q2 or deletes the first question item Q1 and the second question item Q2.

The control unit 30 stores, in the storage unit 40, change contents of the first question item Q1 and the second question item Q2 input by the user (information gathering person) and contents of the first question item Q1 and the second question item newly added.

In addition, the control unit 30 deletes the first question item Q1 and the second question item, which are instructed to be deleted by the user (information gathering person), from the storage unit 40.

The control unit 30 newly executes the operations of S100 to S112 in FIG. 3 for the changed, added, or deleted first question item Q1 and second question item Q2.

Even not in the operations of S100 to S112 in FIG. 3, it is naturally possible to change the contents of the first question item Q1 and the second question item Q2 stored in the storage unit 40, add the first question item Q1 and the second question item Q2, and delete the first question item Q1 and the second question item Q2.

In this way, since the first question item Q1 and the second question item Q2 can be changed, added, or deleted at any timing, it is possible to cope with a case where there is a change in contents of public offering. That is, even for the same subsidy, the contents of public offering may vary depending on the offering time, and in this case, revision and abolition and increase and decrease of the examination item may occur.

In addition, the country, the local governing bodies, or related organizations that found the subsidy, or a commissioned company that is entrusted with a subsidy application project (hereinafter, these parties are referred to as a founding side) may provide the information processing system S1 according to the embodiment.

That is, the founding side subdivides the examination items of the subsidy and sets the first question item Q1 and the second question item Q2.

A company that wants to apply for the subsidy, a management instructor at a chamber of commerce and industry involved in the management consultation of the company, or a management consultant (hereinafter, these parties are referred to as an applicant side) uses the information processing system S1 in which the first question item Q1 and the second question item Q2 are set by the founding side, and inputs the first answer data A1 and the second answer data A2 that is stored in the storage unit 40.

The founding side reads the first answer data A1 and the second answer data A2 input by the applicant side and performs examination.

For example, regarding subsidies for small and medium enterprises found by the Ministry of Economy, Trade and Industry, the Organization for Small and Medium Enterprises and Regional Innovation is assigned as an agency in charge, and the Organization for Small and Medium Enterprises and Regional Innovation formulates application guidelines and examination items. The actual application work will be handled by a commissioned company.

In this example, the Organization for Small and Medium Enterprises and Regional Innovation and the commissioned company are the above-described founding side, and subdivide the examination items and set the first question item Q1 and the second question item Q2.

As described above, by using the information processing system S1 in which the first question item Q1 and the second question item Q2 are set by the founding side, the contents of the examination items are plain and clear to the applicant side, and thus it is possible to easily discuss the application and give answers.

Also on the founding side, it is possible to efficiently determine compatibility of an answer of the applicant side with respect to an examination item, and it is possible to reduce variation in the examination caused by knowledge, experience, or skill of examiners of the founding side.

Fourth Embodiment

In the first to third embodiments described above, a case is assumed where a management consultation occurs or a business plan for subsidy application is created in a chamber of commerce and industry or the like, with a counselor who belongs to the chamber of commerce and industry or who is commissioned by the chamber of commerce and industry being set as a user (an information gathering person), and a member of the chamber of commerce and industry being set as a consulter.

An information processing system S2 according to the embodiment is an information processing system in which one information processing system S1 is installed for each of a plurality of chambers of commerce and industry, and that includes a control server 90 that integrally controls the plurality of systems S1.

The information processing system S2 according to the embodiment is capable of centrally controlling, using the control server 90, a database obtained by the information processing system S1 at each chamber of commerce and industry, and referring to, using the control server 90, a database obtained in the past even in another chamber of commerce and industry as necessary, thereby achieving the purpose of sharing information between the chambers of commerce and industry.

Figure 15:
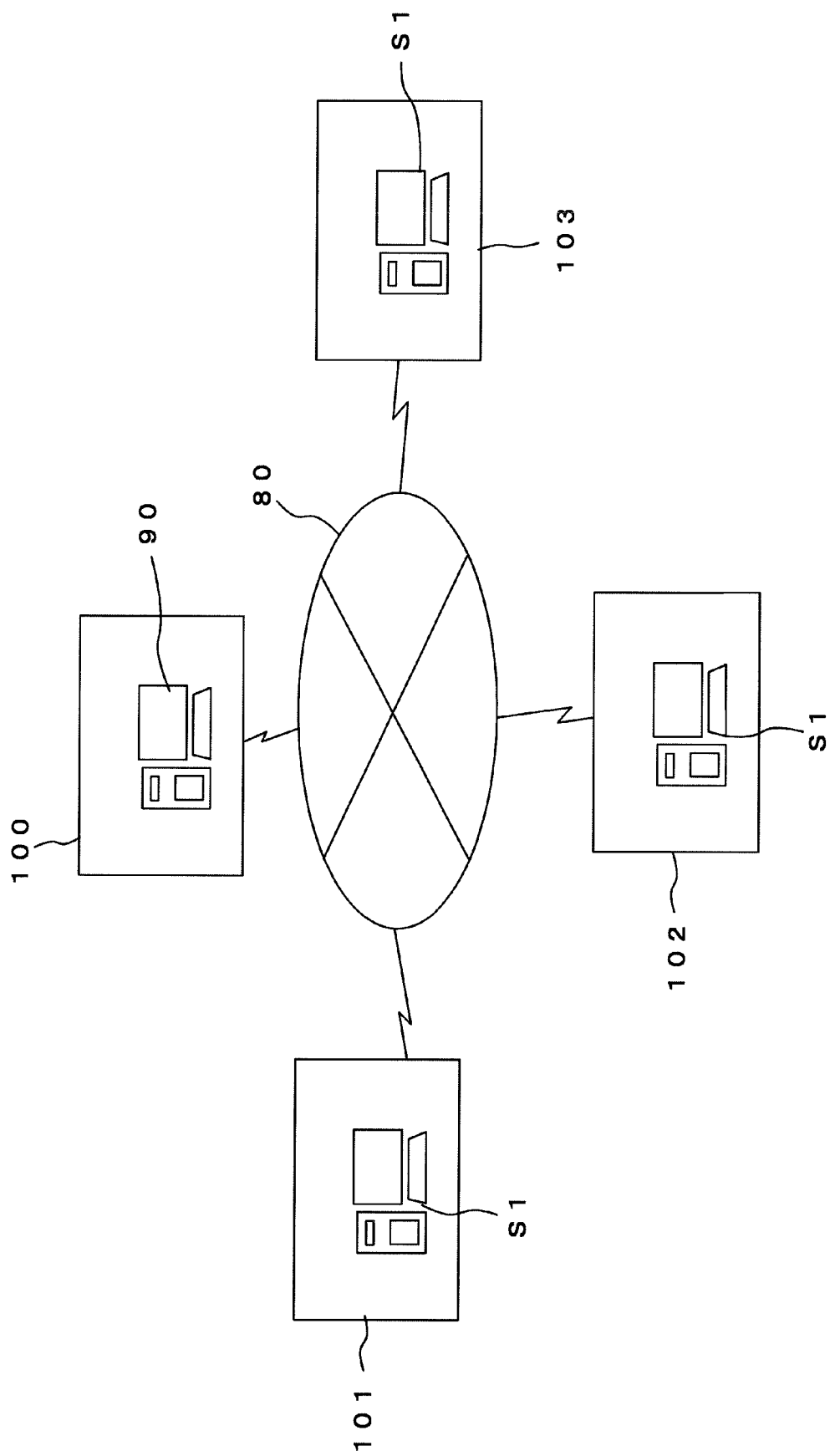
FIG. 15 is a block diagram of an information processing system according to a fourth embodiment.

FIG. 15 illustrates a schematic configuration of the information processing system S2 according to the embodiment. The same components as those of the above-described embodiments are denoted by the same reference signs, and a description thereof may be omitted.

In the information processing system S2, the information processing system S1 is provided in each of a plurality of chambers of commerce and industry 100 to 103. Further, the control server 90 is installed at any one of the plurality of chambers of commerce and industry.

A place where the control server 90 is installed is not limited to any chamber of commerce and industry, and may be a control company that controls and operates the present system.

The control server 90 and each information processing system S1 are connected by a communication line 80. The communication line 80 may be a line such as the Internet.

When the control server 90 and the information processing system S1 are arranged in the same building, the communication line 80 may be a wireless LAN or a wired LAN.

Figure 16:
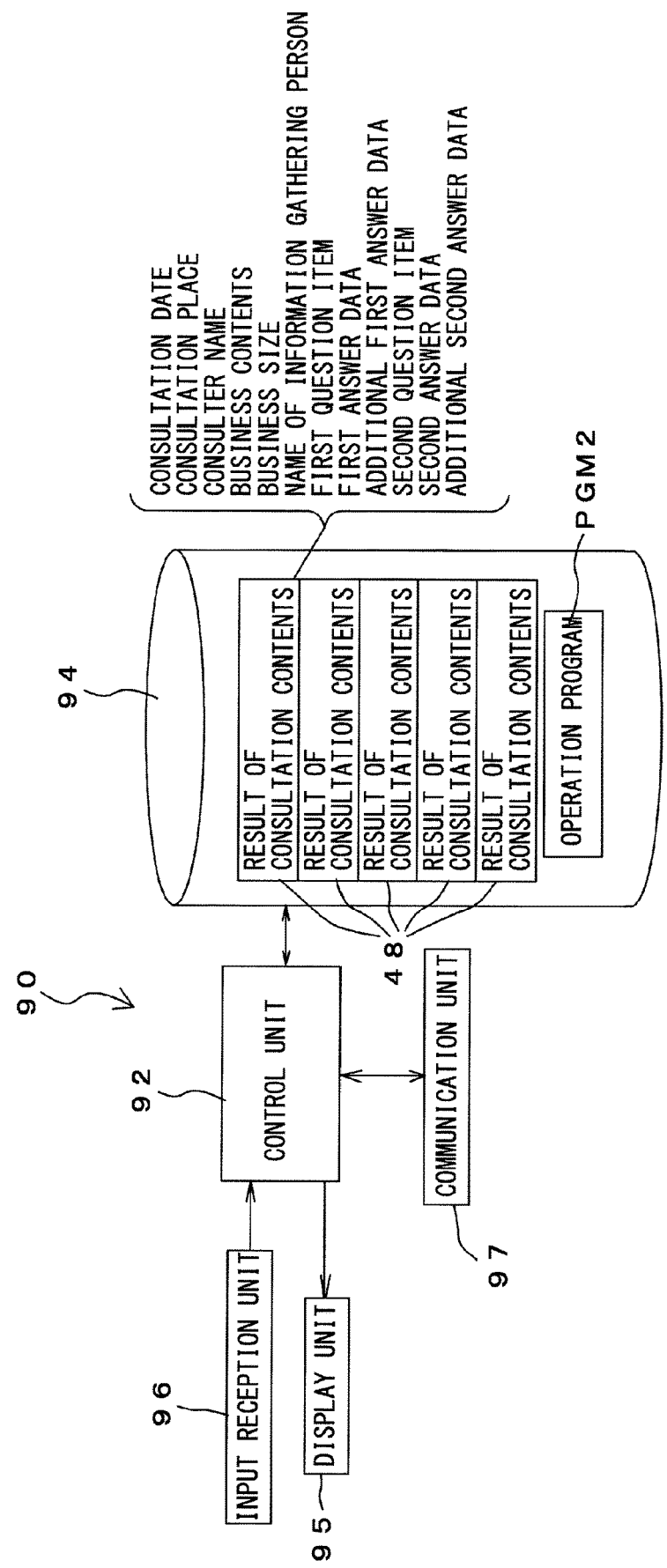
FIG. 16 is a block diagram of a control server according to a fifth embodiment.

FIG. 16 illustrated a configuration of the control server.

The control server 90 includes a control unit 92, a storage unit 94, a display unit 95, an input reception unit 96, and a communication unit 97.

In the storage unit 94, the result data 48 of consultation contents for each consultation obtained from each information processing system S1 is stored as a database (here, the result data 48 in the second embodiment is used as an example). The storage unit 94 stores an operation program PGM2 of the control server 90.

The storage unit 94 corresponds to, for example, a ROM, a hard disk, or an SSD, which is a nonvolatile memory.

The control unit 92 includes a CPU, a RAM, and a ROM, and controls operations of the control server 90. The control unit 92 calls the predetermined operation program PGM2 from the storage unit 94 and sequentially executes predetermined types of processing.

The display unit 95 corresponds to a display, and the input reception unit 96 corresponds to a mouse or a keyboard.

It is assumed that a person (an operator) who operates the control server 90 is a person in charge of a chamber of commerce and industry or a control company, and the operator needs to sign a non-disclosure agreement to avoid leaking data, which is a consultation result, to outside parties.

The control unit 30 of each information processing system S1 creates the result data 48 of consultation contents every time one consultation is completed, and at this time, the control unit 30 stores the data in the storage unit 40 of the corresponding information processing system S1 and accesses the control server 90 to store the result data 48 of the consultation contents in the storage unit 94 of the control server 90.

The operation of accessing the control server 90 and storing the result of the consultation contents in the storage unit 94 of the control server 90 is executed based on the information processing program PGM1 in each information processing system S1.

Therefore, in the storage unit 94 of the control server 90, results of the consultation contents in the plurality of chambers of commerce and industry are made into a database.

The storage unit 94 of the control server 90 constructs a database such that a plurality of results of consultation contents made into database can be retrieved by a predetermined key word or the like.

The retrieval may be performed by accessing the control server 90 from the information processing system S1 in each chamber of commerce and industry.

In this way, by making results of past consultation contents in the control server 90 retrievable, it is possible to share information between a plurality of chambers of commerce and industry. Further, by including a business field and a business size of the consulter in the stored results of the consultation contents, for example, when there is a consultation from a manager in the same business field in another chamber of commerce and industry, it is possible to conduct a management consultation with reference to past consultation contents in the same business field in a range that conforms to the laws regarding personal information protection, trade secret protection, and confidentiality.

In addition, case studies will be conducted at each chamber of commerce and industry, and the knowledge and skills of counselors can be improved.

When a new consultation is conducted by referring to a result of past consultation contents using a retrieval function, the control unit 30 of each information processing system S1 performs control to associate the referred result of the consultation contents with a result of new consultation contents and store the associated results in the storage unit 94 of the control server 90.

By storing a plurality of consultation results in the storage unit 94 of the control server 90 in association with each other, it is possible to collectively confirm past consultation contents in the same business field, and to use the past consultation contents for future consultation and discussion.

Fifth Embodiment

In an information processing system S3 according to the embodiment, one information processing system S1 is installed for each of a plurality of chambers of commerce and industry, and the plurality of information processing systems S1 execute distributed processing without a control server performing centralized control.

Figure 17:
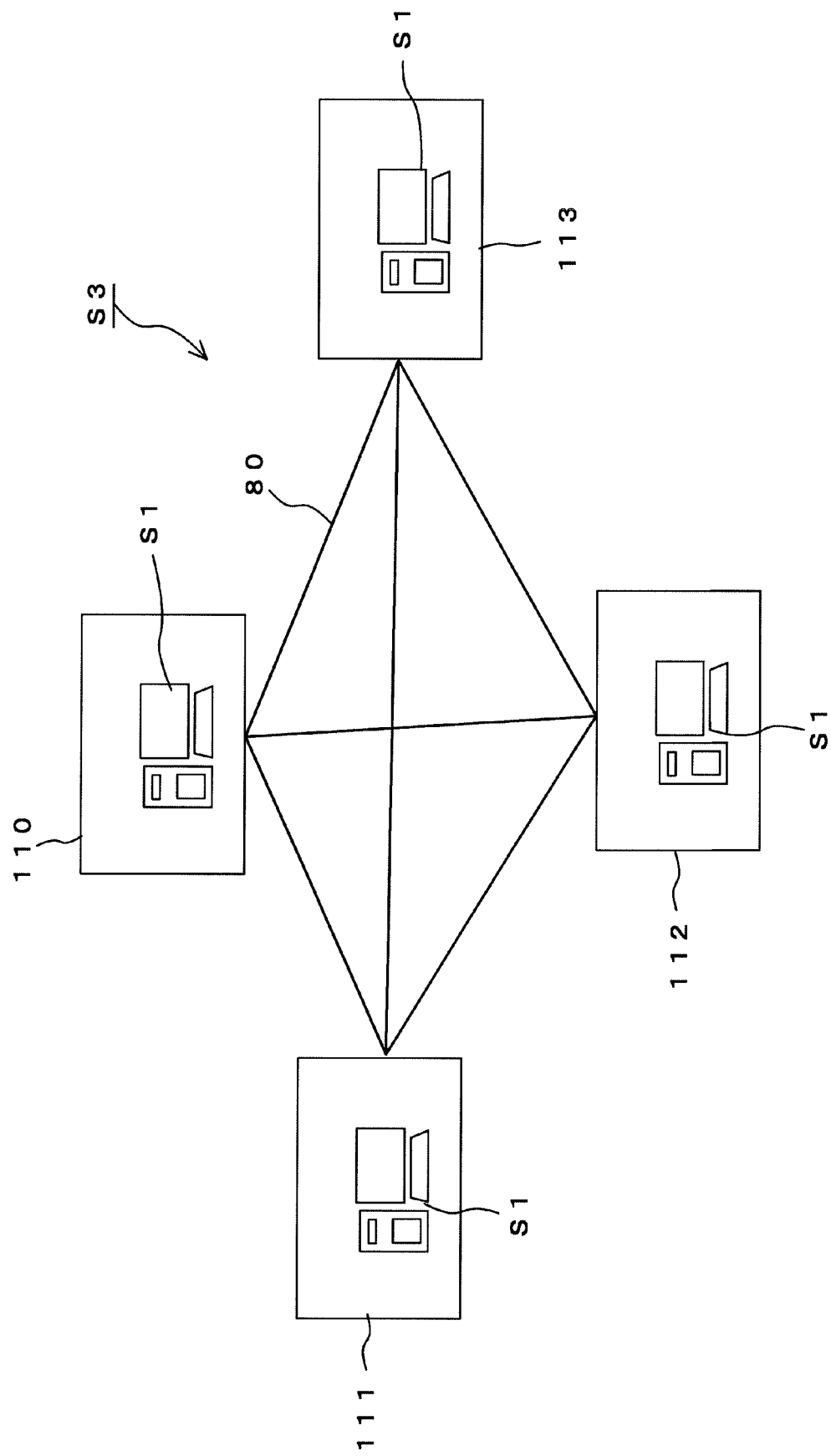
FIG. 17 is a block diagram of an information processing system according to a sixth embodiment.

As illustrated in FIG. 17, for example, in four chambers of commerce and industry 110 to 113, the information processing systems S1 are communicably connected to each other by the communication line 80 such as the Internet.

Here, the information processing systems S1 operate in synchronization with each other, and when result data of consultation contents is added to one information processing system S1, the same result data is added to the other information processing systems S1 by mirroring. The mirroring is implemented by control such that, in any one information processing system S1, when the control unit 30 stores the result data 48 in the storage unit 40 of the information processing system S1, the control unit 30 simultaneously stores the result data 48 in the storage units 40 of the other information processing systems S1.

In the embodiment, a block-chain technique may be adopted. By adopting the block-chain technique, with regard to the result data 48 created by any one of the information processing systems S1, the result data 48 created by the other information processing systems S1 is embedded in a hash function to form blocks. Thus, it can contribute to prevention of forgery of the result data 48 of the consultation contents, and the result data 48 of the consultation contents can be treated as valuable data as a copyrighted work whose value is in being unable to be tampered with and being proven to be genuine.

In addition, since the result data 48 of the consultation contents obtained according to the embodiment is genuine and it is possible to prove who created the data, it is possible to present the data to an interested party, a financial institution, or the like on the assumption that a business activity, a management plan, and a business plan elaborated with a supporting organization such as a chamber of commerce and industry, as well as essential parts or the gist thereof are credible. In addition, since the result data 48 of the consultation contents obtained according to the embodiment is credible and genuine, the result data 48 can be evaluated as data that is instrumental in due diligence.

In addition, even when the invention is applied to a case of creating a proposal document as an in-house document, the proposal document can be handled as a genuine document and it is possible to prove who created the proposal document.

Sixth Embodiment

In each of the embodiments described above, a basic configuration is provided in which a user (information gathering person) operates an information processing system installed in a chamber of commerce and industry or the like to input contents obtained through information gathering from a consulter.

However, the information processing system S1 according to the first embodiment and the second embodiment may be privately owned by a manager or the like (the information processing program PGM1 can be executed by a privately owned computer), and the manager or the like alone can serve as an information gathering person and give answers. In this case, there is no particular change in the system, and the usage method is simply different.

In this way, the manager or the like personally uses the information processing system S1 to perform, on his/her own, setting of a first question item and a second question item, input of first answer data and second answer data, and further input of additional first answer data and input of an additional second question item and additional second answer data, and thus the information processing system S1 can be personally used as a tool for organizing confused thoughts of the manager.

Further, although the systems in the embodiments described above execute operations by describing programs, the systems may also execute the operations by describing operation rules using rule-based AI.

Seventh Embodiment

In each of the embodiments described above, an object is to organize confused thoughts of a consulter. In the following embodiments, it is possible to organize, improve, refine, specialize, detail, clarify, or structure confused thoughts of a consulter by giving a hint, and it is possible to support the consulter who has confused thoughts. In addition, the following effects can be expected for contents that can be supported by giving a hint.

(Effect 1) When parts of a thought of a consulter are absent, by providing a hint to the consulter, the consulter can create missing parts of the thought by himself/herself.

(Effect 2) When thoughts of a consulter are not sufficiently unique, by providing a hint to the consulter, the consulter can brush up on his or her unique and extraordinary thinking.

(Effect 3) When review of thoughts of a consulter is not sufficient, by providing a hint to the consulter, the consulter can eliminate a mistake that is often overlooked in his/her thoughts.

Figure 18:
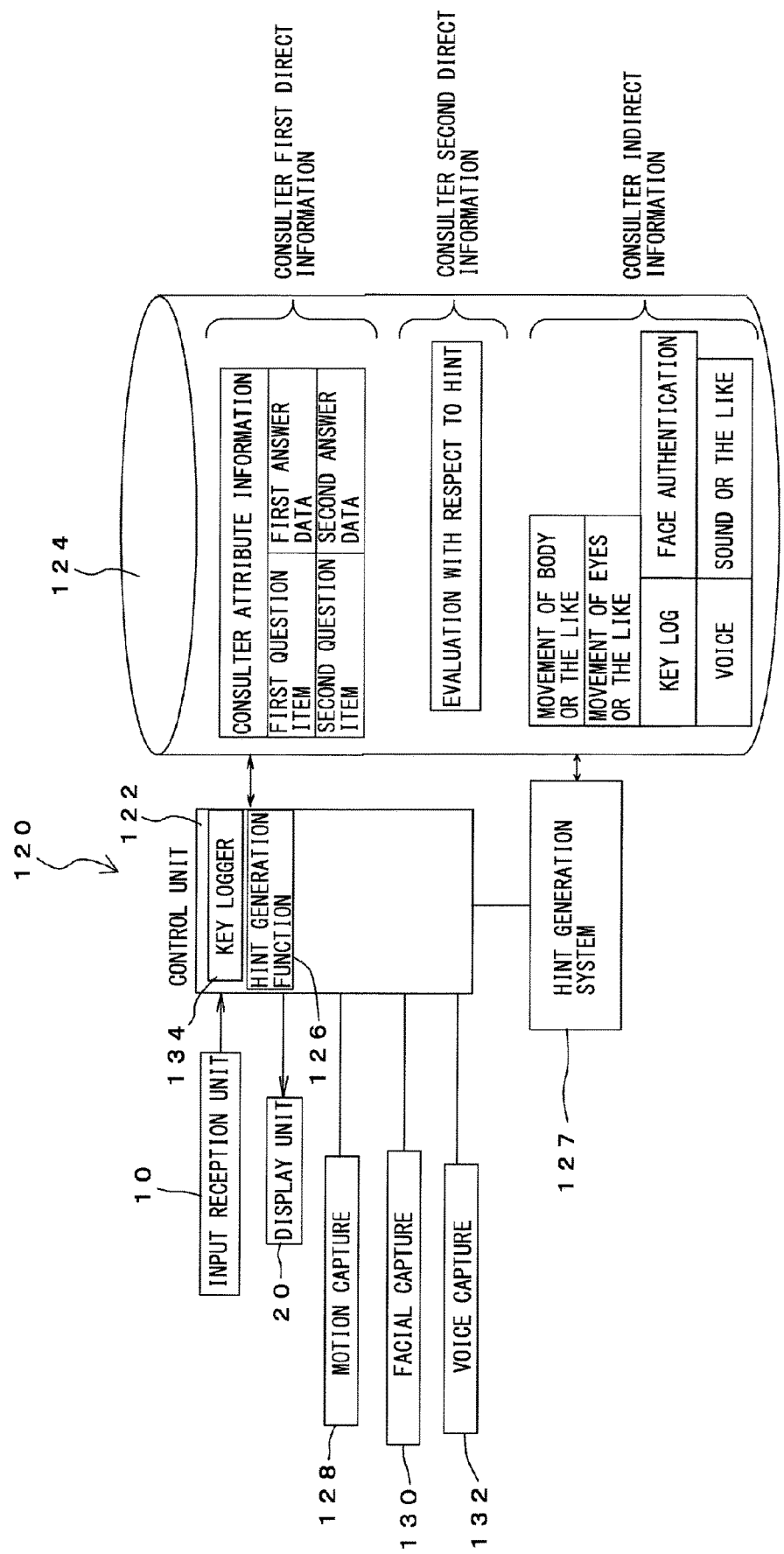
FIG. 18 is a block diagram of an information processing system according to a seventh embodiment.

FIG. 18 illustrates a block diagram of a basic configuration of an information processing system according to a seventh embodiment.

The same components as those of the above-described embodiments are denoted by the same reference signs, and a description thereof may be omitted.

A control unit 122 is provided with a hint generation function 126. The hint as used herein includes two types, that is, a qualitative hint including qualitative information and a quantitative hint including quantitative information. The hint generation function 126 can be implemented by any one of a program, a rule-based AI, and deep learning. The hint generation function 126 may be constructed as a separate hint generation system 127.

The hint generation function 126 or the hint generation system 127 uses data input in the past or data in the process of an input operation to generate a hint. For example, the hint generation function 126 or the hint generation system 127 has a function of generating a hint based on consulter first direct information, consulter second direct information, and consulter indirect information stored in a storage unit 124 and displaying the hint on the display unit 20.

The consulter first direct information includes a first question item and a second question item that the consulter was asked, first answer data and second answer data that are contents given as answers by the consulter, and consulter attribute information.

The consulter attribute information is attributes of the consulter input in advance and stored in the storage unit 124, and is assumed to include an age, a gender, a profession, a position, a personal history, a birth place, an educational background, and the like of the consulter.

The consulter second direct information includes an evaluation provided by the consulter with respect to a hint generated by the hint generation function 126 or the hint generation system 127.

After the hint generated by the hint generation function 126 or the hint generation system 127 is displayed on the display unit 20, the control unit 122 displays an evaluation input portion (not shown) on the display unit 20, and prompts the consulter to input an evaluation with respect to the hint, thereby obtaining the evaluation provided by the consulter. When a sentence can be directly input using the evaluation input portion (not shown), the consulter inputs an evaluation with respect to the hint in sentences. The evaluation input portion (not shown) may be configured such that the number of stars can be input or an icon of "Like" can be pressed. In this case, it is assumed that the number of stars, and the "Like" being pressed or not being pressed are evaluations provided by the consulter.

Various devices for acquiring the consulter indirect information are connected to the control unit 122. The consulter indirect information is not information directly input in the past as words by the consulter, but is contents obtained by detection of a state of the consulter such as the face and a movement of the eyeballs and an input time.

Examples of the various devices for acquiring the consulter indirect information include a motion capture 128 configured to acquire a movement of the body of the consulter as data, a facial capture 130 for face authentication or configured to acquire a movement of the eyes or the like of the consulter as data, a voice capture 132 configured to acquire a voice of the consulter as data, a key logger 134 configured to acquire an operation on the input reception unit 10 (a mouse or a keyboard) performed by the consulter as data, and the like.

In addition, the other examples of the various devices for acquiring the consulter indirect information further include position information of a GPS or the like, device information, sensor information, network information, and the like of a mobile phone possessed by the consulter.

In addition, the hint generated by the hint generation function 126 or the hint generation system 127 must not be an answer that can be used as the first answer data or the second answer data. This is because the hint no longer reflects thoughts of the consulter.

The hint generated by the hint generation function 126 or the hint generation system 127 includes the qualitative hint and the quantitative hint as described above.

First, the qualitative hint will be described. It is considered that there are five types of qualitative hints, and each of the five types will be described below.

A qualitative hint 1 is a hint as a word that can be used for an answer as it is. Based on the qualitative hint 1, the consulter can create parts of a thought by using the word of the hint and can complete the thought with parts for organizing. Thus, structuring of the thought can be advanced.

A qualitative hint 2 is a hint that is a stimulus for extraordinary creation. Based on the qualitative hint 2, the consulter can review thought parts that are already thought of and replace the thought parts with more extraordinary thought parts, or create more extraordinary thought parts for thought parts that are not yet thought of. It is possible to improve the uniqueness and extraordinariness of thoughts.

A qualitative hint 3 is a hint based on a contradiction prevention function. Based on the qualitative hint 3, the consulter can eliminate contradictions hidden in thought data and create thought data that is logical and free of the risk of misunderstanding.

A qualitative hint 4 is a hint based on an omission prevention function. Based on the qualitative hint 4, the consulter can eliminate omission hidden in thought data and can create thought data that is free of logical leaps and lack of information.

A qualitative hint 5 is a hint based on a duplication prevention function. Based on the qualitative hint 5, the consulter can eliminate duplication hidden in thought data and can create thought data efficiently that is logical and free of confusion.

Next, the quantitative hint will be described.

The quantitative hint displays extraordinariness in digit values rather than words, and the consulter who is seeking extraordinary thoughts can recognize, through digit values, the extraordinariness of thoughts he/she is organizing. It is possible to create extraordinary thought data by using a digit value, which changes every time an answer is input, as an indicator of refinement of extraordinariness.

Figure 19:
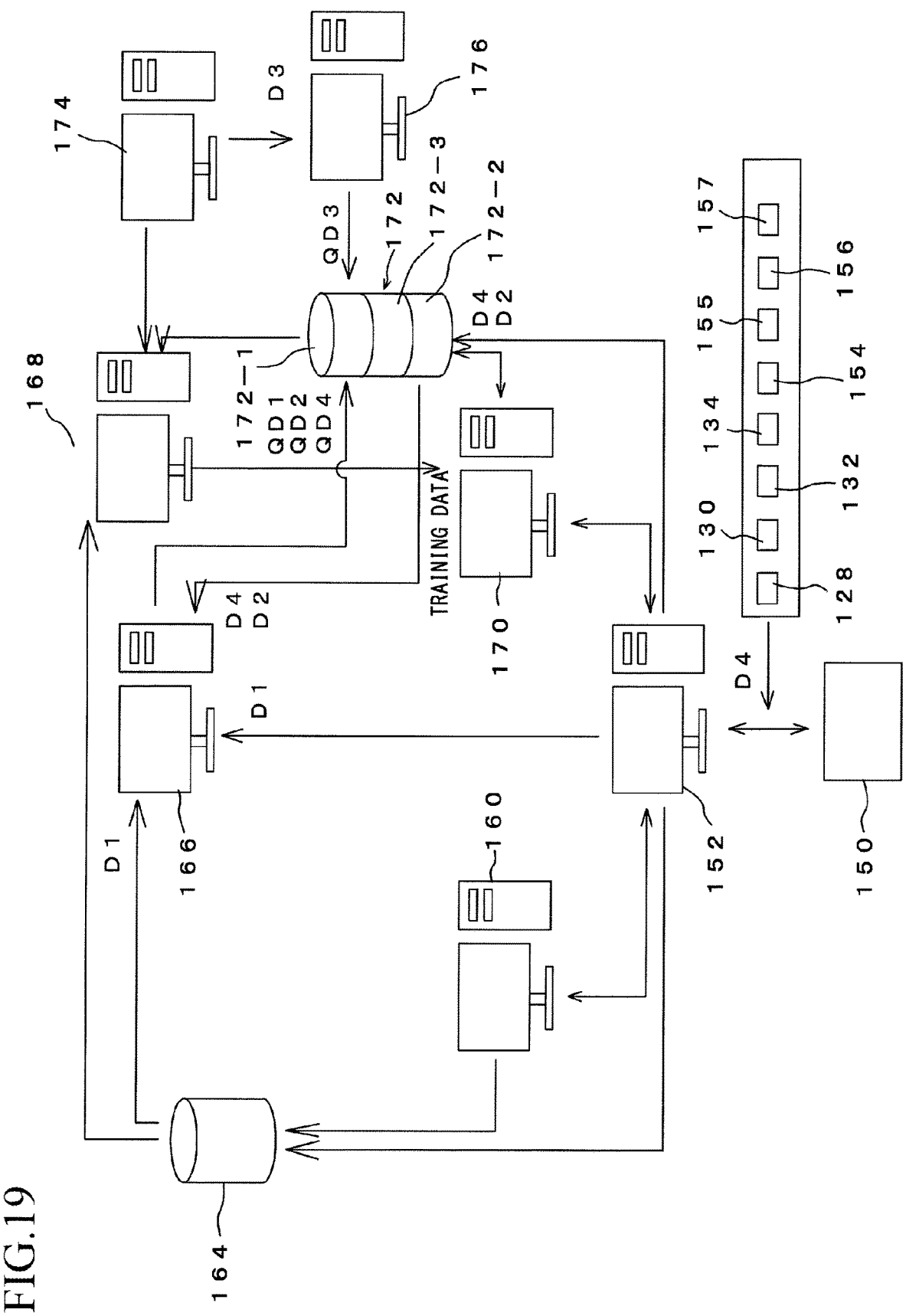
FIG. 19 is a block diagram illustrating a specific configuration of the information processing system according to the seventh embodiment.

Next, FIG. 19 illustrates a detailed embodiment in which the hint generation function is configured as a separate hint generation system. In the example in FIG. 19, an AI system using deep learning serves as the hint generation system.

A consulter terminal 150 facing a consulter is connected with a system computer 152 and data communication is enabled therebetween. The consulter terminal 150 may be a monitor of the system computer 152 or may be a computer independent of the system computer 152.

Various devices for collecting the consulter indirect information are connected to the consulter terminal 150 or the system computer 152. As described above, it is assumed that the devices for collecting the indirect information include the motion capture 128 configured to acquire a movement of the body of the consulter as data, the facial capture 130 configured to acquire face authentication, a movement of the eyes, and the like of the consulter as data, the voice capture 132 configured to acquire a voice of the consulter as data, the key logger 134 configured to acquire an operation on the input reception unit 10 (a mouse or a keyboard) performed by the consulter as data, and position information 154 of a GPS or the like, device information 155, sensor information 156, network information 157 and the like of a mobile phone possessed by the consulter.

A program processing computer 160 is connected with the system computer 152 and data communication is enabled therebetween.

The program processing computer 160 is a computer that executes a function of the information processing system S1 according to the first embodiment by using a program, and executes operations of first displaying a plurality of first question items, and when an information gathering person asks a consulter based on the displayed first question items and answers to at least two first question items are obtained, displaying a second question item corresponding to two first question items, and displaying unanswered question items until answers to all first question items and all second question items are obtained.

In addition, an organizing database 164 for storing answer data and the like of the consulter is connected to the system computer 152 and the program processing computer 160, and can be accessed by the system computer 152 and the program processing computer 160. The first question item, the second question item, the first answer data, and the second answer data are stored in the organizing database 164 for each consulter (consulter first direct information).

The organizing database 164 is also connected to a digitization system 166 described later and an AI training data generation system 168, and can be accessed by the digitization system 166 and the AI training data generation system 168.

For natural language processing, the digitization system 166 has a function of digitizing consulter first direct information stored in the organizing database 164, consulter second direct information stored in a hint database 172, consulter indirect information, all hints generated by a hint generation computer 170, data taken in from an external source 174 as a hint material, and the like.

The digitization system 166 may be implemented by the system computer 152 executing a digitization program, or may be implemented by a computer different from the system computer 152 executing the digitization program.

The AI training data generation system 168 has a function of generating training data used for machine learning of AI in the hint generation computer 170.

That is, the AI training data generation system 168 generates training data by performing processing such as digitization, normalization, and annotation (classification and patterning of data) on the consulter first direct information before the annotation stored in the organizing database 164, the consulter second direct information before the annotation stored in the hint database 172, the consulter indirect information, all hints generated by the hint generation computer 170, external data that is taken in from the external source 174 as the hint material and stored in a post-processing database 172-1 described later, and external data before the annotation that is directly taken in from the external source 174.

Further, the hint generation computer 170 is connected to the system computer 152 and data communication is enabled therebetween.

The hint generation computer 170 is equipped with AI capable of executing deep learning processing, can optimize a weight of hint generation based on the training data stored in the AI training data generation system 168, and can generate a hint based on hint material data stored in the hint database 172.

The hint database 172 includes the post-processing database 172-1 in which data as hint generation material digitized by the digitization system 166 is stored, a non-processing database 172-2 in which the consulter second direct information, the consulter indirect information, and the external data taken in from the external source 174, which are raw data before the digitization, are stored, and a storage database 172-3 in which a hint generated in the past is stored.

The post-processing database 172-1 can provide a hint material to the hint generation computer 170.

The external source 174 corresponds to an external computer, a database (including a corpus) or AI of the present system.

The AI training data generation system 168 takes in data used for updating machine learning of AI from the external source 174, and generates training data.

Further, an external data digitization system 176 takes in data useful for generating a hint from the external source 174. External data digitized by the external data digitization system 176 is stored in the post-processing database 172-1.

The external source 174 may not be connected to the information processing system according to the embodiment.

Specific data processing in the system illustrated in FIG. 19 will be described below.

When a digitization request (request for hint generation) is transmitted from the system computer 152 to the digitization system 166, the digitization system 166 that received the digitization request extracts, from the organizing database 164, consulter first direct information D1 that is first answer data and/or second answer data that a consulter input most recently and in the past and the consulter attribute information, and digitizes the extracted data.

The consulter first direct information D1 is assumed to be text data.

When a digitization request is transmitted from the system computer 152 to the digitization system 166, the digitization system 166 extracts consulter second direct information D2 from the non-processing database 172-2 of the hint database 172 and digitizes the extracted data. The consulter second direct information D2, the hint database 172, and the non-processing database 172-2 will be described later.

The digitization system 166 has a function of performing natural language processing on text data. Here, as part of the natural language processing, the digitization system 166 executes distributed representation of a word (representing a word as a vector). In the embodiment, representing a word as a vector is referred to as digitization.

The digitization system 166 executes digitization processing in the order of preprocessing of text data, vocabulary construction, and vectorization.

The preprocessing of text data is processing of adjusting the text data to an appropriate format, and includes cleaning processing of deleting a punctuation mark or a special character of the text data, tokenization processing of dividing a sentence of the text data into a word and a phrase, stemming processing of performing matching for stems of words that change in word form, and lemmatization processing of converting a word into a basic form.

The vocabulary construction is to uniquely specify all words appearing in the text data and construct a set of words.

The vectorization is to vectorize a word, and is to locate a word or a phrase on a vector space and mathematical embedding the word or phrase into a continuous vector space. Vectorization using distributed representation using a corpus may be used.

Consulter first direct information QD1 obtained by digitization of the digitization system 166 is stored in the post-processing database 172-1 of the hint database 172.

The consulter second direct information D2, which is an evaluation (text data or digit value data) provided by the consulter with respect to a hint, is transmitted from the system computer 152 to the non-processing database 172-2 of the hint database 172 and is stored therein. As described above, the consulter second direct information D2 of the non-processing database 172-2 is taken into the digitization system 166 and digitized, and consulter second direct information QD2 obtained by digitization is stored in the post-processing database 172-1 of the hint database 172.

In the digitization system 166, when the evaluation provided by the consulter with respect to the hint is text data, distributed representation of words included in the text data (that is, representing the words in vectors) is executed.

In addition, in the digitization system 166, when the evaluation provided by the consulter with respect to the hint is digit value data, distributed representation of words of the hint is executed, and weighting according to the digit value data is executed.

The external data digitization system 176 also receives external data D3 serving as a hint material provided from the external source 174. As described above, the external data digitization system 176 digitizes the external data. External data QD3 obtained by digitization is stored in the post-processing database 172-1 of the hint database 172.

Consulter indirect information D4 collected by the various devices 128, 130, 132, 134, 154, 155, 156, 157 is transmitted from the system computer 152 to the non-processing database 172-2 of the hint database 172 and is stored therein. The consulter indirect information D4 is transmitted from the non-processing database 172-2 to the digitization system 166 to be digitized. Consulter indirect information QD4 obtained by digitization is stored in the post-processing database 172-1 of the hint database 172.

The hint generation computer 170 reads the consulter first direct information QD1, the consulter second direct information QD2, the external data QD3, and the consulter indirect information QD4 obtained by digitization of the digitization system 166 from the post-processing database 172-1 to generate a hint. At the time of hint generation, the hint generation computer 170 reads and collates with past hints stored in the storage database 172-3 so as to avoid duplication of a hint that is generated and output in the past.

The past hints stored in the storage database 172-3 is digitized by the digitization system 166 and stored in the post-processing database 172-1. When generating data based on the consulter first direct information QD1, the consulter second direct information QD2, the external data QD3, and the consulter indirect information QD4, the digitized past hints are used to generate a hint in combination with these types of data. Furthermore, when the AI training data generation system 168 generates training data, the past hints stored in the storage database 172-3 are used for generating the training data for weight optimization in combination with the consulter first direct information D1, the consulter second direct information D2, the external data D3, the consulter indirect information D4, and the like.

As the consulter indirect information D4, motion capture data is subjected to kinematical analysis, posture estimation, model base tracking and the like to be digitized.

Facial capture data is subjected to facial expression recognition, facial expression analysis, emotion analysis, and the like to be digitized.

An action history is subjected to temporal pattern analysis, sequence analysis, a statistical method, and the like to be digitized.

Voice capture data is subjected to temporal pattern analysis, sequence analysis, a statistical method, and the like to be digitized.

The position information is subjected to address geocoding, space clustering, spatial correlation analysis, and the like to be digitized.

The device information records a state and usage of a device, and a statistical method, a machine learning algorithm, and the like are executed to digitize the device information.

The sensor information is subjected to temporal pattern analysis, Fourier transform, spectrum analysis, and the like to be digitized.

The network information is subjected to traffic analysis, flow analysis, packet analysis, and the like to be digitized.

Next, how to execute hint generation will be specifically described with reference to FIGS. 20 to 24.

Figure 20:
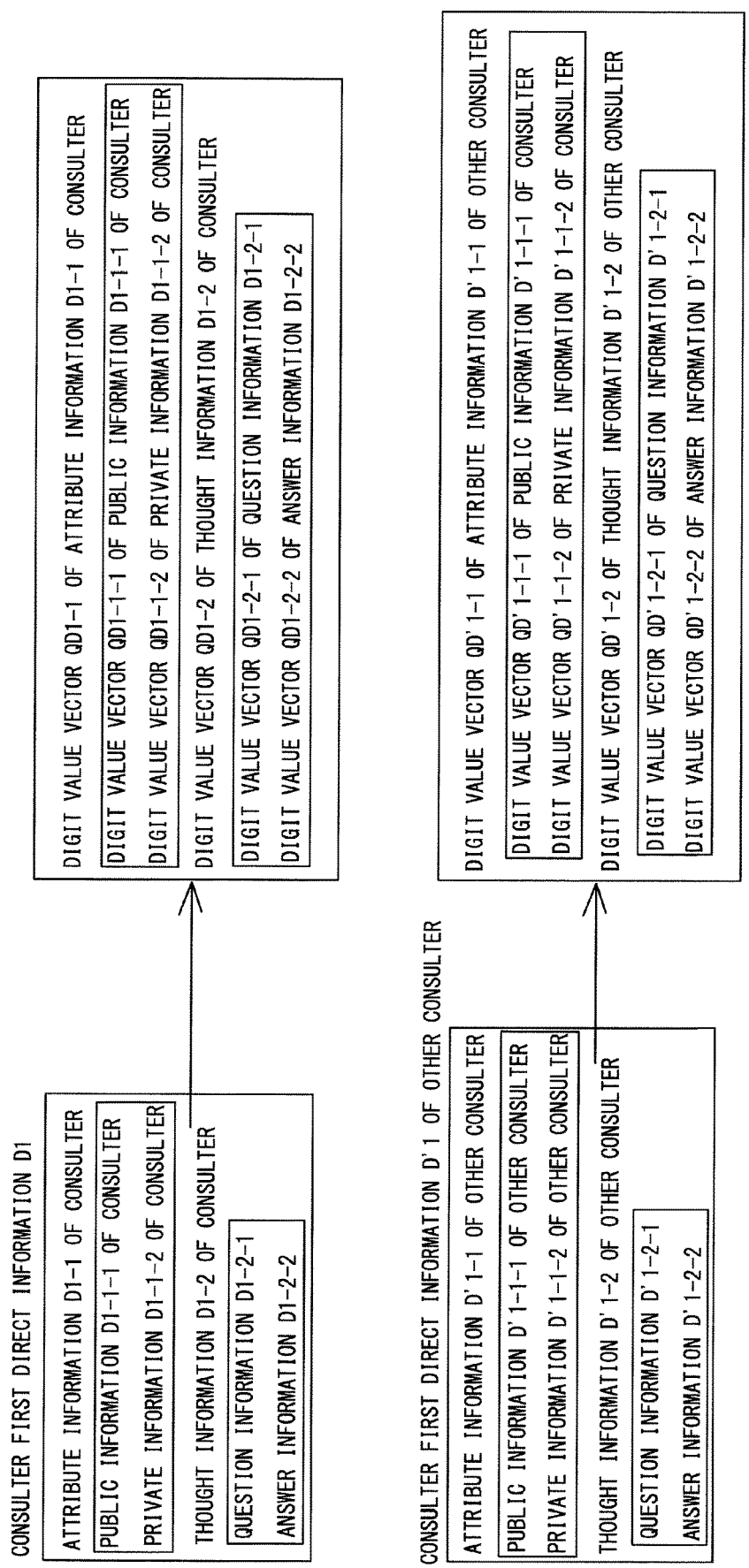
FIG. 20 is an explanatory diagram of digitization of a digitization system.

In FIG. 20, in the digitization system 166, digitization of consulter first direct information and digitization of consulter first direct information of another consulter are described.

The consulter first direct information D1 includes attribute information D1-1 of a consulter. The attribute information D1-1 of the consulter includes a name, an industry type, and the like of the consulter as public information D1-1-1 of the consulter, and includes information on a hobby, a like and a dislike, and the like of the consulter as private information D1-1-2 of the consulter.

In addition, the consulter first direct information D1 includes thought information D1-2 of the consulter. The thought information D1-2 of the consulter includes question information D1-2-1 including a first question item and a second question item to the consulter, and answer information D1-2-2 including first answer data and second answer data of the consulter.

In the digitization system 166, a word in the public information D1-1-1 of the consulter included in the attribute information D1-1 of the consulter as the consulter first direct information D1 is processed into a digit value vector QD1-1-1. Similarly, a word in the private information D1-1-2 is processed into a digit value vector QD1-1-2.

In the digitization system 166, vectors of all words of the question information D1-2-1 and the answer information D1-2-2 included in the thought information D1-2 of the consulter as the consulter first direct information D1 are processed into digit value vectors QD1-2-1 and QD1-2-2, respectively.

Further, the consulter first direct information of another consulter other than the above consulter is similarly subjected to digit value vectorization.

In the digitization system 166, a word of public information D'1-1-1 of the other consulter included in attribute information D'1-1 of the other consulter as consulter first direct information D'1 of the other consulter is processed into a digit value vector QD'1-1-1. Similarly, a word in private information D'1-1-2 is processed into a digit value vector QD'1-1-2.

In the digitization system 166, vectors of all words of question information D'1-2-1 and answer information D'1-2-2 included in thought information D'1-2 of the other consulter as the consulter first direct information D'1 of the other consulter are processed into digit value vectors QD'1-2-1 and QD'1-2-2, respectively.

In digit value vectorization of text data performed by the digitization system 166 illustrated in FIG. 20, the processing is executed in the order of preprocessing of the text data, tokenization of the text data, vectorization, and vector normalization. The processing is implemented by a central processing unit such as a CPU or GPU in the digitization system 166 executing natural language processing software such as Word2Vec, GloVe, and FastText.

In the preprocessing of text data, the digitization system 166 executes processing of deleting a special character, an unnecessary character, a symbol, and a punctuation mark from the text data, processing of unifying upper-case letters to lower-case letters in the case of English letters, processing a number (tokenization in order to handle in digit values), processing of deleting a stop word (frequently appearing vocabulary), stemming processing (processing of converting a word into a word stem (basic form) thereof), lemmatization processing (processing of converting a word into a basic form thereof), and the like.

In the tokenization of text data, the digitization system 166 executes processing of dividing a text into units of words or phrases.

In the vectorization, the digitization system 166 executes processing of converting the tokenized text into vectors.

In the vector normalization, the digitization system 166 executes processing of normalizing a magnitude of the vector.

Figure 21:
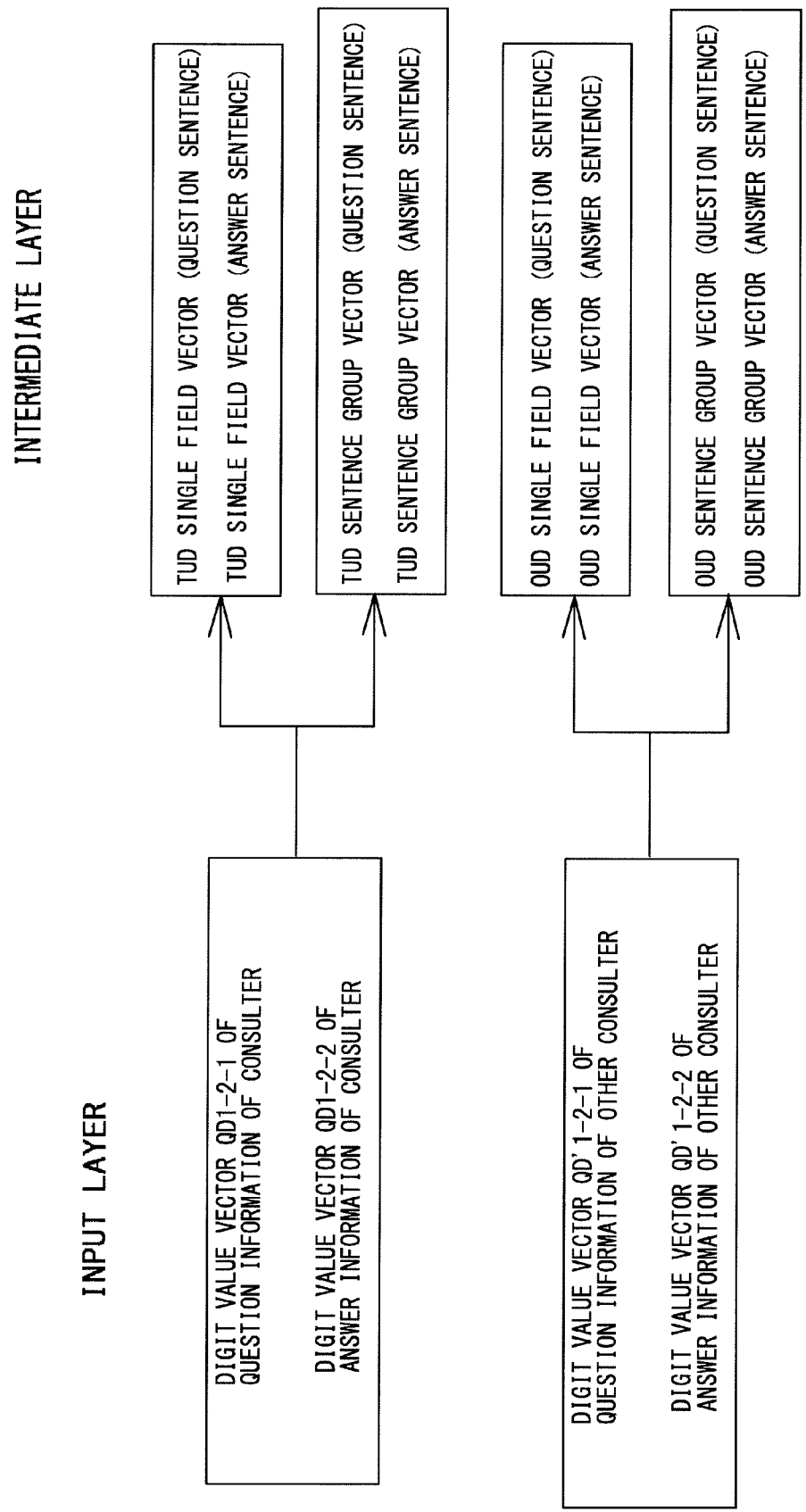
FIG. 21 is an explanatory diagram of data input from an input layer to an intermediate layer of deep learning using AI.

The next processing will be described with reference to FIG. 21.

A digit value vector obtained by vectorization performed by the digitization system 166 is input to an input layer of deep learning using the AI of the hint generation computer 170. A plurality of nodes are provided in the input layer, and digit value vectors are received at this node.

In an intermediate layer of the deep learning using the AI of the hint generation computer 170, two types of text vectors (a single field vector and a sentence group vector) are obtained based on the digit value vectors of each word of QD1-2-1 and QD'1-2-1 of the consulter and another consulter's question information subjected to the digit value vectorization, and the digit value vectors QD1-2-2 and QD'1-2-2 of the consulter and another consulter's answer information subjected to the digit value vectorization.

Hereinafter, vector data regarding the consulter himself/herself is referred to as TUD, and vector data regarding another consulter is referred to as OUD.

The single field vector is obtained by vectorizing the text data written in each single field, the single field being an entry field of each piece of question information and each piece of answer information.

The sentence group vector is a sentence vector calculated by regarding the entire vector of each piece of question information and each piece of answer information as a sentence group that is a group of sentences.

In the generation of the single field vector and the sentence group vector, the intermediate layer of the deep learning using the AI of the hint generation computer 170 can take a word in each single field as a target and performs processing thereon by averaging, weighted averaging, output of an intermediate layer of a long short term memory (LSTM) or a transformer, a sentence encoder, an additive construction method, an integration construction method, a recurrent neural network (RNN), a graph neural network (GNN), and the like.

The intermediate layer of the deep learning of the AI in the hint generation computer 170 generates a TUD single field vector (question sentence), a TUD single field vector (answer sentence), a TUD sentence group vector (question sentence), a TUD sentence group vector (question sentence), an OUD single field vector (question sentence), an OUD single field vector (answer sentence), an OUD sentence group vector (question sentence), and an OUD sentence group vector (question sentence).

As the next processing, outputting a generated hint will be described with reference to FIGS. 22 to 27.

The hint generation computer 170 is capable of generating the type of hint according to the request of the consulter. As described above, the types of hint include the qualitative hints 1 to 5 and the quantitative hint.

First, by operating the system computer 152 or the consulter terminal 150, the consulter requests any hint of the qualitative hints 1 to 5 and the quantitative hint, and specifies the number of hints to be displayed. The hint generation computer 170 generates a hint in accordance with an instruction from the consulter that is input from the system computer 152 or the consulter terminal 150, and operates to display the hint on the consulter terminal 150.

Figure 22:
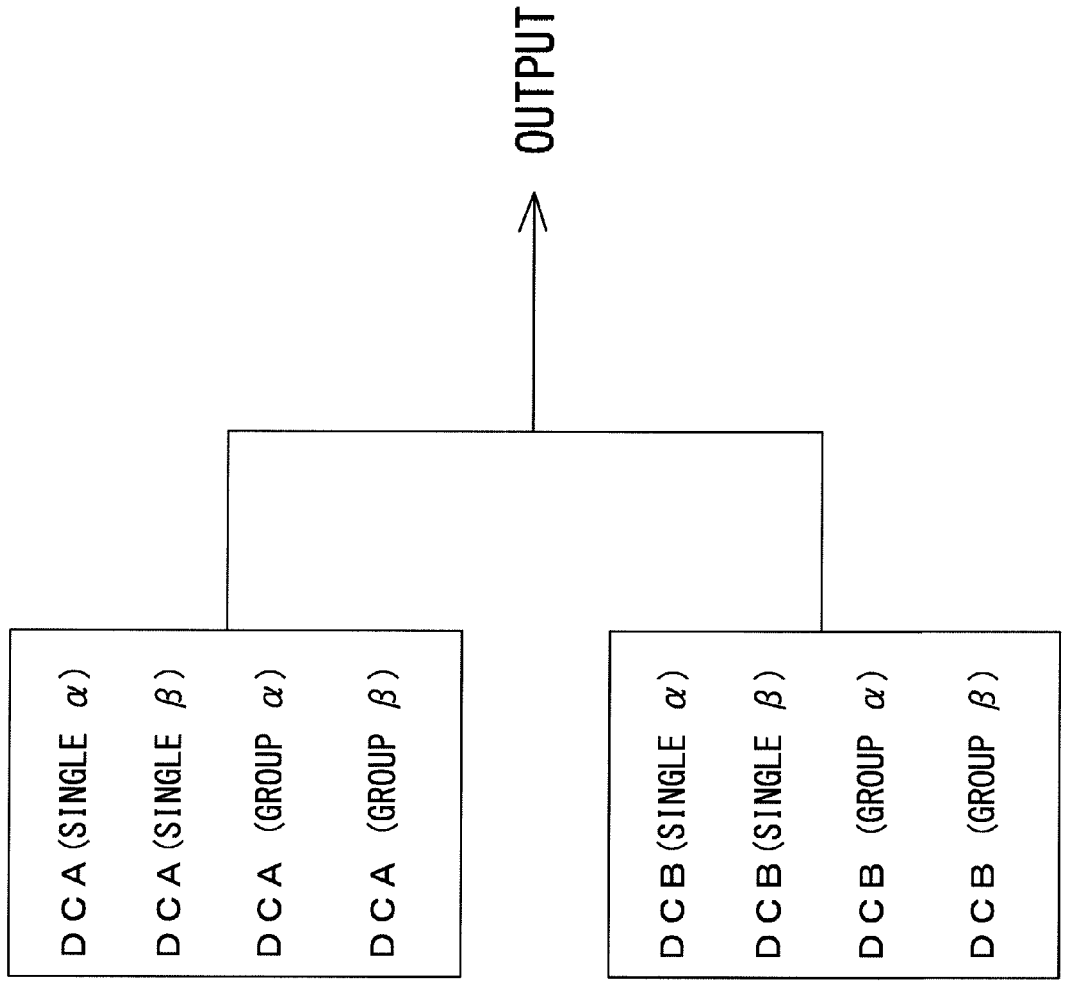
FIG. 22 is an explanatory diagram explaining an output of a qualitative hint 1.

In FIG. 22, regarding the qualitative hint 1 as a hint that can be used for an answer as it is, the AI of the hint generation computer 170 generates two types of hint, that is, a hint DCA that is a word in an OUD vector having high relevance to a TUD vector and a hint DCB in an OUD vector having low relevance to a TUD vector.

DCA is a word in an OUD having high relevance to the TUD vector, and the following four patterns are conceivable. It is assumed that the following single field vector and sentence group vector are either a question, an answer, or both.

The degree of relevance is calculated using cosine similarity, Euclidean distance, Pearson's correlation coefficient, clustering, or the like.

(1) DCA (single α): a word used in an OUD single field vector having high relevance to a TUD single field vector.

(2) DCA (single β): a word used in a single field vector that is a constituent part of an OUD sentence group vector having high relevance to a TUD single field vector.

(3) DCA (group α): a word used in an OUD single field vector having high relevance to a TUD sentence group vector.

(4) DCA (group β): a word used in a single field vector that is a constituent part of an OUD sentence group vector having high relevance to a TUD sentence group vector.

DCB is a word in an OUD having low relevance to a TUD vector, and the following four patterns are conceivable. It is assumed that the following single field vector and sentence group vector are either a question, an answer, or both.

(1) DCB (single α): a word used in an OUD single field vector having low relevance to a TUD single field vector.

(2) DCB (single β): a word used in a single field vector that is a constituent part of an OUD sentence group vector having low relevance to a TUD single field vector.

(3) DCB (group α): a word used in an OUD single field vector having low relevance to a TUD sentence group vector.

(4) DCB (group β): a word used in a single field vector that is a constituent part of an OUD sentence group vector having low relevance to a TUD sentence group vector.

Figure 23:
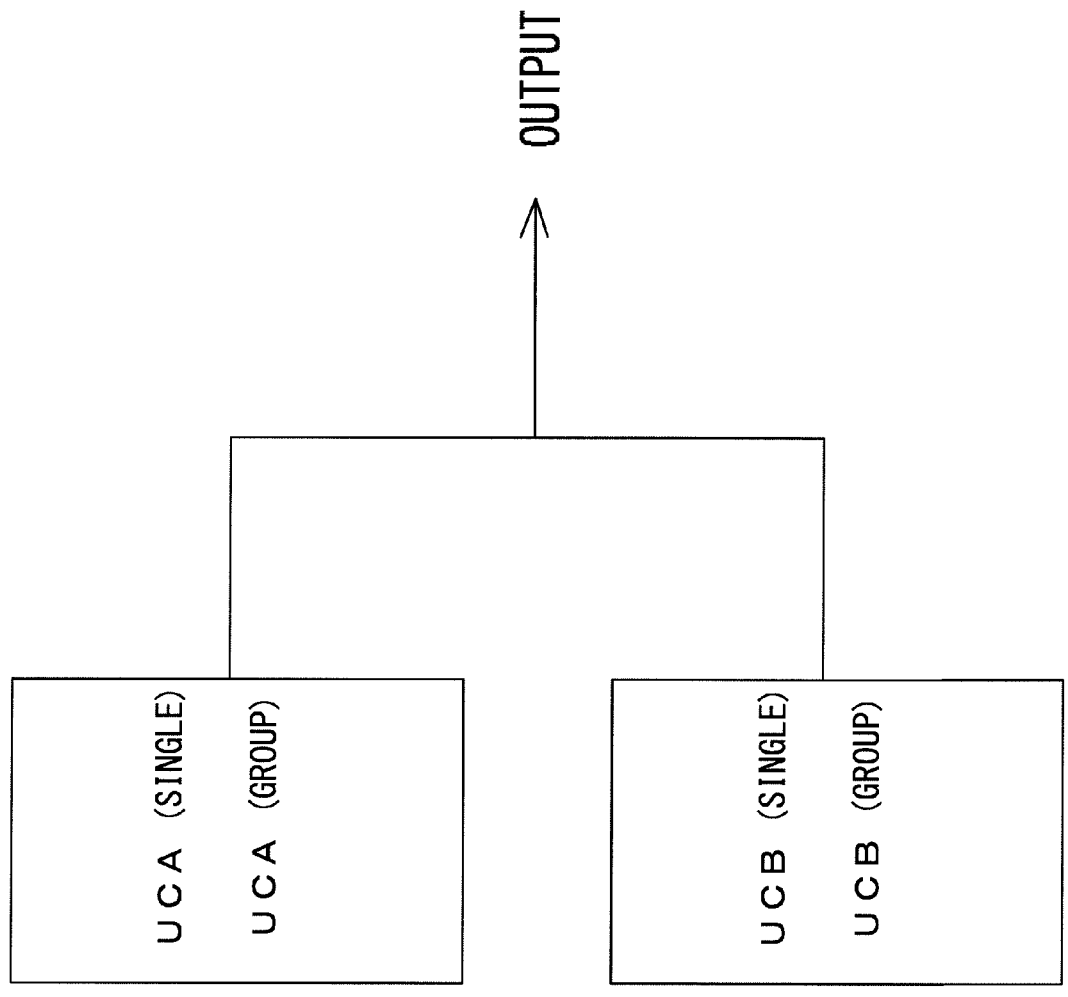
FIG. 23 is an explanatory diagram explaining an output of a qualitative hint 2.

Next, in FIG. 23, regarding the qualitative hint 2 as a hint to be a stimulus for extraordinary creation, the AI of the hint generation computer 170 generates two types of hint, that is, a hint UCA quoting a word of a vector calculated as having high relevance to a TUD vector from a corpus, and a hint UCB quoting a word of a vector calculated as having low relevance to a TUD vector from a corpus.

The degree of relevance is calculated using cosine similarity, Euclidean distance, Pearson's correlation coefficient, clustering, or the like.

The following two patterns of UCA are conceivable.

(1) UCA (single): an unused and dissimilar word collated with an OUD word list after quoting, from a corpus, a word of a vector having high relevance to a TUD single field vector.

(2) UCA (group): an unused and dissimilar word collated with an OUD word list after quoting, from a corpus, a word of a vector having high relevance to a TUD sentence group vector.

The following two patterns of UCB are conceivable.
(1) UCB (single): an unused and dissimilar word collated with an OUD word list after quoting, from a corpus, a word of a vector having low relevance to a TUD single field vector.
(2) UCB (group): an unused and dissimilar word collated with an OUD word list after quoting, from a corpus, a word of a vector having low relevance to a TUD sentence group vector.

Such UCA and UCB can provide hints of words that are not used by other consulters and that can be used directly or indirectly to create highly unique thoughts.

Figure 24:
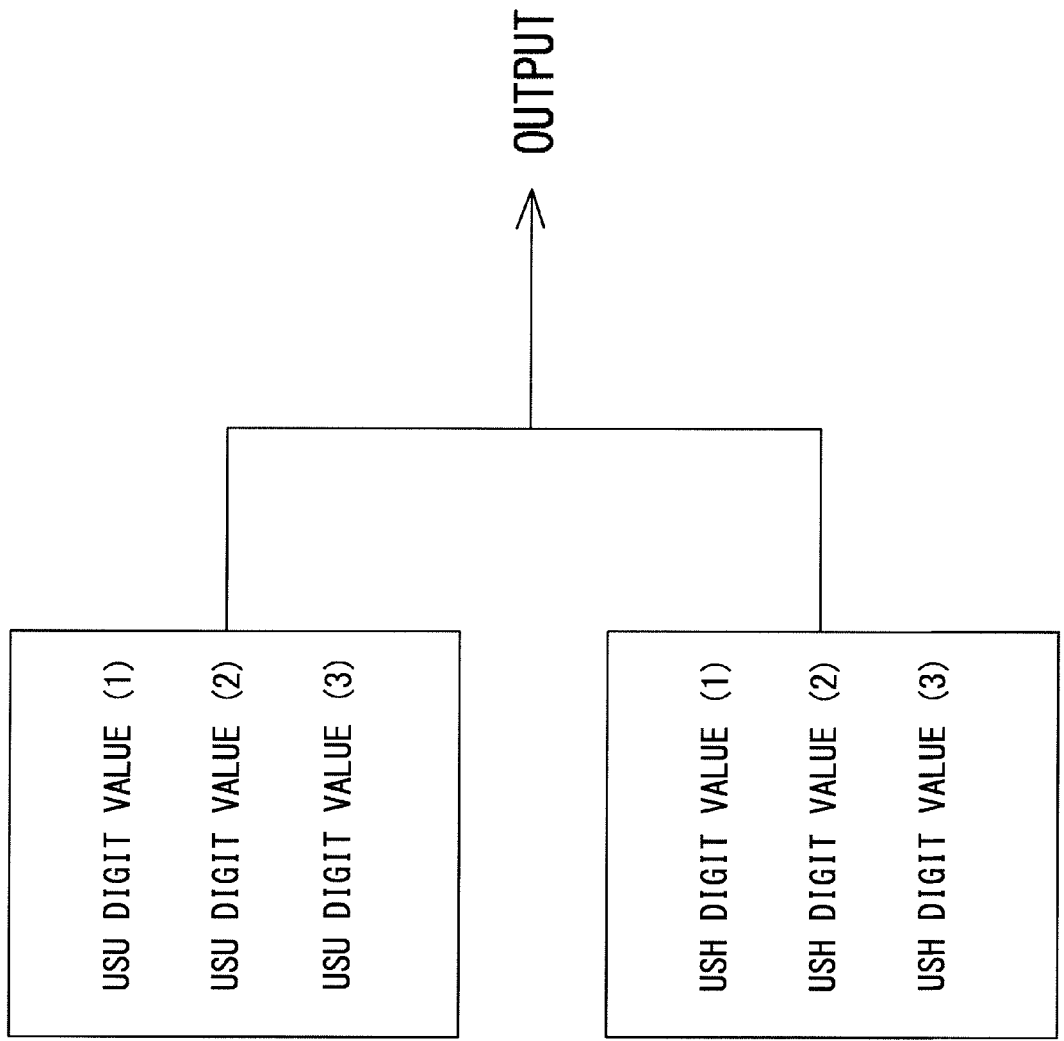
FIG. 24 is an explanatory diagram explaining an output of a quantitative hint.

Next, in FIG. 24, regarding the quantitative hint indicating extraordinariness by a digit value rather than a word, the AI of the hint generation computer 170 generates two types of hint, that is, a USU that is a hint for each single field and a USH that is a hint for a sentence group.

Calculation of the USU is executed as follows.

First, an average value (aveUV) of the single field vectors of all consulters is calculated.

Then, a norm (distance: omitted) between a single field vector of each consulter and the average value (aveUV) of the single field vectors of all consulters is calculated. At this time, a norm (UNV-TUD) between a TUD single field vector and the average value of the single field vectors of all consulters, and a norm (UNV-OUD) between an OUD single field vector and the average value of the single field vectors of all consulters are calculated.

Next, an average value (aveUN) of the norms between the single field vectors of all consulters and the average value of the single field vectors is calculated.

Finally, when a word vector is normalized to −1 to 1 and each single field vector falls within a range of −1 to 1, a USU score indicated between 0 to 1000 points is calculated by the following equation.

$$\text{The USU score} = |(\text{UNV-TUD}) - \text{aveUN}|/4\sigma \times 1000 \; (\sigma: \text{standard deviation})$$

Based on the calculation method described above, the following three patterns of USU as a digit value that can be used as a hint are conceivable.

USU Digit Value (1): (UNV-TUD)

It is understood how much the single field vector of the consulter deviates from the average, and it can be determined that the larger the norm is, the higher the originality is.

USU Digit Value (2): (aveUN)

It is understood how much the single field vector of the other consulter deviates from the average, and validity of the value of the USU digit value (1): (UNV-TUD) can be determined.

USU Digit Value (3): USU Score

A degree of uniqueness presented by the single filed vector of the consulter (whether the single field vector is highly original) is indicated at 0 to 100 points. A larger score indicates a higher degree of uniqueness.

Calculation of the USH is executed as follows.

First, an average value (aveHV) of the sentence group vectors of all consulters is calculated.

Then, a norm between the sentence group vector of each consulter and the average value (aveHV) of the sentence group vectors of all consulters is calculated. At this time, a norm (HNV-TUD) between a TUD sentence group vector and the average value of the sentence group vectors of all consulters, and a norm (HNV-OUD) between an OUD sentence group vector and the average value of the sentence group vectors of all consulter are calculated.

Next, an average value (aveHN) of the norms between the sentence group vectors of all consulters and the average value of the sentence group vectors is calculated.

Finally, when a word vector is normalized to −1 to 1 and each sentence group vector falls within a range of −1 to 1, a USH score displayed between 0 to 1000 points is calculated by the following equation.

$$\text{The USH score} = |(\text{HNV-TUD}) - \text{aveHN}|/4\sigma \times 1000 \; (\sigma: \text{standard deviation})$$

Based on the calculation method described above, the following three patterns of USH as a digit value that can be used as a hint are conceivable.

USH Digit Value (1): (HNV-TUD)

It is understood how much the sentence group vector of the consulter deviates from the average, and it can be determined that the larger the norm is, the higher the originality is.

USH Digit Value (2): (aveHN)

It is understood how much the sentence group vector of the other consulter deviates from the average, and validity of the value of the USH digit value (1): (HNV-TUD) can be determined.

USU Digit Value (3): USH Score

A degree of uniqueness presented by the sentence group vector of the consulter (whether the sentence group vector is unique) is indicated at 0 to 100 points. A larger score indicates a higher degree of uniqueness.

Figure 25:
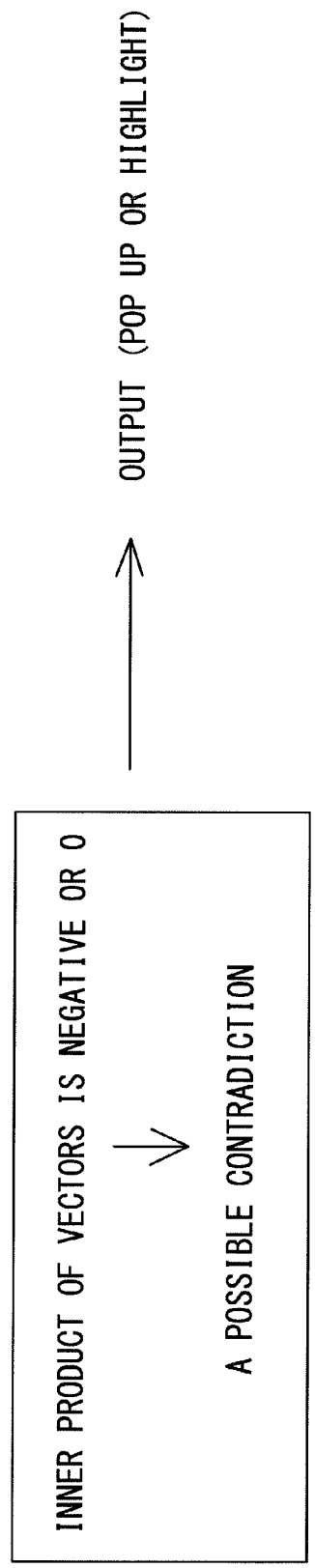
FIG. 25 is an explanatory diagram explaining an output of a qualitative hint 3.

Next, in FIG. 25, the AI of the hint generation computer 170 generates the qualitative hint 3 that is a hint based on a contradiction prevention function.

When a possible contradiction is detected, the AI of the hint generation computer 170 controls the system computer 152 so that the consulter terminal 150 pops up or highlights a relevant part.

In the generation of the qualitative hint 3 by the hint generation computer 170, data in the TUD is collated with edited external data (vectorized corpus or the like) to detect a possible contradiction in the data in TUD. When directions of vectors are opposite to each other, it can be determined that there is a highly possible contradiction.

In a detection pattern, the AI of the hint generation computer 170 determines whether there are no contradictory word vectors inside the TUD single field vector, whether there are no contradictory word vectors between the TUD single field vector and another single field vector, and whether there are no contradictory word vectors between the TUD single field vector and the TUD sentence group vector.

Regarding the determination of contradiction, when an inner product of the word vectors is negative, it can be determined that the vectors are oriented in opposite directions and there is a possible contradiction. When the inner product of the word vectors is close to 0, it can be determined that there is a possible contradiction since the vectors are orthogonal to each other.

As a method other than the above pattern in which the AI of the hint generation computer 170 generates the qualitative hint 3 that is a hint based on the contradiction prevention function, the following method is provided.

An attention mechanism in machine translation synthesizes word vectors of words that are used at a high frequency among words in the TUD single field vector or of words similar thereto, and a vector created accordingly is set as an important word extraction text vector, and it is determined whether there are contradictory important word extraction text vectors within the TUD single field vector or within the TUD sentence group vector.

Instead of extracting presence or absence of a contradiction based on words, detection may be performed using a plurality of words or clauses as targets for determining the presence or absence of a contradiction.

Next, in FIG. 26, the AI of the hint generation computer 170 generates the qualitative hint 4 that is a hint based on the omission prevention function.

When a possible omission is detected, the AI of the hint generation computer 170 controls the system computer 152 so that the consulter terminal 150 pops up or highlights a relevant part.

Regarding the generation of the qualitative hint 4 by the hint generation computer 170, the following two patterns are conceivable.

In the first pattern, a word used at a high frequency included in the OUD single field vector or a word similar thereto is extracted. When the extracted word is not used in the TUD, a message is displayed indicating that the word is not used.

In the second pattern, a word used at a high frequency included in a single field vector of external data having common or highly related single field vectors, or a word similar thereto is extracted. When the extracted word is not used in the TUD, a message is displayed indicating that the word is not used.

Since the word extracted in this way is a word having a high frequency of use in other consulters or external data, the uniqueness is not lost even when a consulter uses this word. If the consulter intentionally does not use this word, the uniqueness increases.

An omission target may not be a word, and detection may be performed using a plurality of words or clauses as the omission target.

As a method other than the above two patterns in which the AI of the hint generation computer 170 generates the qualitative hint 4 that is a hint based on the omission prevention function, the following method is provided.

An attention mechanism in machine translation synthesizes word vectors of words that are used at a high frequency among words included in the OUD single field vector or among words included in a single field vector of external data having common or highly related single field vectors, or synthesizes word vectors of words similar thereto, and a vector created accordingly is set as an important word extraction text vector. When the important word extraction text vector is not used in the TUD single field vector, a message is displayed indicating that the important word extraction text vector is not used.

Figure 27:
FIG. 27 is an explanatory diagram explaining an output of a qualitative hint 5.

Next, in FIG. 27, the AI of the hint generation computer 170 generates the qualitative hint 5 that is a hint based on the duplication prevention function.

When a possible duplication is detected, the AI of the hint generation computer 170 controls the system computer 152 so that the consulter terminal 150 pops up or highlights a relevant part.

Regarding the generation of the qualitative hint 5 by the hint generation computer 170, all single field vectors in the TUD are compared, and word vectors with a high degree of commonality are indicated as potentially having duplicate contents.

Examples of detection target patterns include a first pattern focusing on words composed of the same character and a second pattern focusing on words not composed of the same character but having the same meaning (that is, vectors present at adjacent positions).

Examples of the first pattern include a pattern in which all words existing in a single field vector are compared with those in another single field vector and a possible duplication is suggested when the number of common word vectors or a ratio of the common word vectors in a text exceeds a certain value, a pattern in which an attention mechanism in machine translation compares words determined as having high importance among words in a single field vector and a possible duplication is suggested when the number of common word vectors or a ratio of the common word vectors in a text exceeds a certain value, and a pattern in which a group of vectors is captured for each clause or a group of words and is synthesized into a vector and a possible duplication is suggested if there is a vector common to the vector.

Examples of the second pattern include a pattern in which all words existing in a single field vector are compared with those in another single field vector and a possible duplication is suggested when the number or a ratio of word vectors having similar digit values exceeds a certain value, a pattern in which an attention mechanism in machine translation compares words determined as having high importance among words in a single field vector and a possible duplication is suggested when the number of word vectors, which can be determined to be common based on similarity levels thereof, or a ratio of the word vectors in a text exceeds a certain value, and a pattern in which a group of vectors is captured for each clause or a group of words and is synthesized into a vector and a possible duplication is suggested if there is a vector similar to the vector.

As a method other than the above two patterns in which the AI of the hint generation computer 170 generates the qualitative hint 5 that is a hint based on the duplication prevention function, the following method is provided.

An attention mechanism in machine translation synthesizes word vectors that are determined as having high importance among words in a single field vector, a vector created accordingly is set as an important word extraction text vector and is compared with an important word extraction text vector of another single field vector, and when a high level of similarity is presented, a possible duplication is suggested.

Although an example is described in the seventh embodiment in which the function of generating a hint is implemented using deep learning of AI, the function of generating a hint may be implemented using rule-based AI or a program.

Although the plurality of embodiments according to the invention have been described above, the invention is not limited to a management consultation or creation of a business plan for subsidy application at a chamber of commerce and industry and can be applied to various consultations such as a medical inquiry at a medical institution, a fund raising consultation at a financial institution, and a consultation on university or career at an educational institution, and modifications can be made without departing from the invention.

What is claimed is:

1. An information processing system comprising:
 a storage unit configured to store a plurality of first question items set in advance and a second question item set in advance based on a relationship between at least one pair of first question items selected among the plurality of first question items;
 an input reception unit configured to receive an input from a user;
 a display unit; and
 a control unit, wherein the control unit executes
  first processing in which each of the first question items is displayed on the display unit, second processing in which in a case where first answer data corresponding to each of two first question items among the first question items displayed on the display unit is input by the user, when there is an unanswered second question item corresponding to the input first answer data, the display unit displays the unanswered second question item and an unanswered first question item, and when there is no unanswered second question item corresponding to the input first answer data, the display unit continuously displays an unanswered first question item, third processing in which each time first answer data corresponding to the first question item is input, presence or absence of a second question item based on a relationship between first question items corresponding to the already input first answer data is confirmed, and when an unanswered second question item is present, the display unit displays the unanswered second question item as well as a second question item and a first question item that are displayed but unanswered, and when there is no unanswered second question item, the display unit continuously displays a second question item and a first question item that are displayed but unanswered, fourth processing in which the third processing is repeatedly executed until all first answer data corresponding to each of the first question items and all second answer data corresponding to each of the second question items is input, and fifth processing in which each time the first answer data and the second answer data is input or after all the first answer data and all the second answer data is input from the second processing to the fourth processing, the input first answer data and the input second answer data are stored in the storage unit.

2. The information processing system according to claim 1, wherein
priorities of the plurality of stored first question items are set in advance and stored in the storage unit.

3. The information processing system according to claim 2, wherein
the control unit
causes the display unit to constantly display a priority change field to enable change of the priorities of the plurality of first question items stored in the storage unit, and
when a changed priority is input into the priority change field, stores change data of the input priority in the storage unit.

4. The information processing system according to claim 2, wherein
when outputting collectively the first question item, the second question item, the first answer data, and the second answer data stored in the storage unit, the control unit executes the output in an order of a first question item having a higher priority, first answer data associated with the first question item having a higher priority, a second question item including first answer data having a higher priority, and second answer data corresponding to the second question item having a higher priority, based on the priorities of the first question items that are set in advance and stored.

5. The information processing system according to claim 3, wherein
when collectively outputting the first question item, the second question item, the first answer data, and the second answer data stored in the storage unit, the control unit executes the output in an order of a first question item having a higher priority, first answer data associated with the first question item having a higher priority, a second question item including first answer data having a higher priority, and second answer data corresponding to the second question item having a higher priority, based on priorities of the first question items that are stored after being changed from the priorities set in advance.

6. The information processing system according to claim 1, wherein
the control unit
causes the display unit to display a display for confirming presence or absence of additional first answer data after all the first answer data corresponding to each of the first question items and all the second answer data corresponding to each of the second question items are input,
causes the display unit to display an input field of additional first answer data when a message indicating that additional first answer data is present is input by a user,
when additional first answer data is input, causes the display unit to display an input field for inputting an additional second question item between the input additional first answer data and already input first answer data,
causes the display unit to display an input field for inputting additional second answer data corresponding to the additional second question item, and
stores the additional first answer data, the additional second question item, and the additional second answer data in the storage unit each time the additional first answer data, the additional second question item and the additional second answer data corresponding to the additional second question item are input or after all additional first answer data, all additional second question items and all additional second answer data corresponding to the additional second question items are input.

7. The information processing system according to claim 6, wherein
when a predetermined number of pieces or more of additional first answer data is input, the control unit causes the display unit to display a message for stopping subsequent input of the additional first answer data.

8. The information processing system according to claim 6, wherein
the control unit
stores the input additional first answer data in association with first answer data that is an answer to a same first question item among a plurality of pieces of already input first answer data,
causes the display unit to display an input field for inputting a priority of the additional first answer data and the already input first answer data that are associated with each other, and
stores input priorities in the storage unit for the plurality of pieces of already input first answer data and the input additional first answer data that are associated with each other.

9. The information processing system according to claim 6, wherein
the control unit
causes the display unit to constantly display an additional answer data priority change field to enable change of a priority input with respect to a plurality of pieces of already input first answer data and the input additional first answer data that are associated with each other and stored in the storage unit, and
when a changed priority is input into the additional answer data priority change field, stores change data of the input priority in the storage unit.

10. The information processing system according to claim 8, wherein
when collectively outputting the first question item, the second question item, the first answer data, the second answer data, the additional first answer data, the additional second question item, and the additional second answer data stored in the storage unit, the control unit executes the output in an order of a first question item having a higher priority, first answer data having a higher priority among first answer data and additional first answer data associated with the first question item having a higher priority, a second question item or an additional second question item including first answer data having a higher priority, and second answer data or additional second answer data corresponding to the second question item or additional second question item having a higher priority, based on priorities of first question items stored in advance or stored after being changed and the priorities of the plurality of pieces of already input first answer data and the input additional first answer data that are associated with each other.

11. The information processing system according to claim 9, wherein
when collectively outputting the first question item, the second question item, the first answer data, the second answer data, the additional first answer data, the additional second question item, and the additional second answer data stored in the storage unit, the control unit executes the output in an order of a first question item having a higher priority, first answer data having a higher priority among first answer data and additional first answer data associated with the first question item having a higher priority, a second question item or an additional second question item including first answer data having a higher priority, and second answer data or additional second answer data corresponding to the second question item or additional second question item having a higher priority, based on priorities of first question items stored in advance or stored after being changed and the priorities stored after being changed of the plurality of pieces of already input first answer data and the input additional first answer data that are associated with each other.

12. The information processing system according to claim 1, wherein
the control unit
causes the display unit to constantly display a question item change button to enable change, addition, or deletion of contents of the plurality of first question items and/or a plurality of the second question items stored in the storage unit,
stops the first processing to the fifth processing in execution when the question item change button is pressed,
causes the display unit to display a question item change field, and
stores change contents or addition contents input in the question item change field of the display unit in the storage unit, and when deletion of the first question item and/or the second question item is input in the question item change field, deletes an instructed first question item and/or second question item from the storage unit.

13. The information processing system according to claim 1, wherein
the control unit
causes the display unit to display an input field for inputting which of the first answer data and/or the second answer data stored in the storage unit attachment data serving as a supplementary material for the first answer data and/or the second answer data is to be associated with, and
stores the attachment data and the first answer data and/or the second answer data in the storage unit in association with each other based on contents input into the input field.

14. The information processing system according to claim 1, wherein
the control unit has a hint generating function of generating a hint for the first answer data and/or the second answer data input into the input field and displaying the hint on the display unit.

15. The information processing system according to claim 14, wherein
regarding a hint generated by the hint generation function, at least one of contradiction, omission, and duplication of the first answer data and/or the second answer data input into the input field is detected and displayed as the hint.

16. The information processing system according to claim 14, wherein
the storage unit stores consulter first direct information including attribute information of a consulter, a first question item and a second question item that the consulter was asked previously, and the first answer data and the second answer data that the consulter gave as an answer previously, and
based on natural language processing or text mining from the consulter first direct information stored in the storage unit, the hint generation function generates a word, a clause, or a sentence that serves as a hint, or generates, as a hint, a digit value indicating extraordinariness of the first answer data and/or the second answer data input into the input field.

17. The information processing system according to claim 16, wherein
the storage unit stores consulter second direct information including an evaluation provided by the consulter with respect to a hint that is generated by the hint generation function and displayed on the display unit, and
based on natural language processing or text mining from the consulter first direct information and the consulter second direct information stored in the storage unit, the hint generation function generates a word, a clause, or a sentence that serves as a hint, or generates, as a hint, a digit value indicating extraordinariness of the first answer data and/or the second answer data input into the input field.

18. The information processing system according to claim 17, wherein
the control unit is connected to a consulter indirect information acquisition device including at least one of a motion capture for observation of an action of a consulter who is giving the first answer data and/or the second answer data, a facial capture for face authentication or for observation of a movement of an eyeball, a key logger, and a voice capture for record of voice, consulter indirect information acquired by the consulter indirect information acquisition device is stored in the storage unit, and based on the consulter first direct information, the consulter second direct information and the consulter indirect information stored in the storage unit, the hint generation function generates a word, a clause, or a sentence that serves as a hint, or generates, as a hint, a digit value indicating extraordinariness of the first answer data and/or the second answer data input into the input field.

19. The information processing system according to claim 14, wherein
the control unit is connected to an external system, and
the hint generation function generates a hint including data stored in the external system.

20. A non-transient computer readable medium for causing a control unit to perform a method, comprising:
executing a first processing in which each of first question items is displayed on a display unit;
executing a second processing in which in a case where first answer data corresponding to each of two first question items among the first question items displayed on the display unit is input by a user, when there is an unanswered second question item corresponding to the input first answer data, the display unit displays the unanswered second question item and an unanswered first question item, and when there is no unanswered second question item corresponding to the input first answer data, the display unit continuously displays an unanswered first question item;
executing a third processing in which each time first answer data corresponding to the first question item is input, presence or absence of a second question item based on a relationship between first question items corresponding to the already input first answer data is confirmed, and when an unanswered second question item is present, the display unit displays the unanswered second question item as well as a second question item and a first question item that are displayed but unanswered, and when there is no unanswered second question item, the display unit continuously displays a second question item and a first question item that are displayed but unanswered;
executing a fourth processing in which the third processing is repeatedly executed until all first answer data corresponding to each of the first question items and all second answer data corresponding to each of the second question items is input; and
executing a fifth processing in which each time the first answer data and the second answer data is input or after all the first answer data and all the second answer data is input from the second processing to the fourth processing, the input first answer data and the input second answer data are stored in a storage unit.

21. The non-transient computer readable medium according to claim 20, wherein
priorities of the plurality of stored first question items are set in advance and stored in the storage unit, and
when collectively outputting the first question item, the second question item, the first answer data, and the second answer data stored in the storage unit, the control unit executes the output in an order of a first question item having a higher priority, first answer data associated with the first question item having a higher priority, a second question item including first answer data having a higher priority, and second answer data corresponding to the second question item having a higher priority, based on the priorities of the first question items that are set in advance and stored.

22. The non-transient computer readable medium according to claim 20, wherein
priorities of the plurality of stored first question items are set in advance and stored in the storage unit, and
the control unit
causes the display unit to constantly display a priority change field to enable change of the priorities of the plurality of first question items stored in the storage unit,
when a changed priority is input into the priority change field, stores change data of the input priority in the storage unit, and
when collectively outputting the first question item, the second question item, the first answer data, and the second answer data stored in the storage unit, executes the output in an order of a first question item having a higher priority, first answer data associated with the first question item having a higher priority, a second question item including first answer data having a higher priority, and second answer data corresponding to the second question item having a higher priority, based on priorities of the first question items that are stored after being changed from the priorities set in advance.

23. The non-transient computer readable medium according to claim 20, wherein
the control unit
causes the display unit to display a display for confirming presence or absence of additional first answer data after all the first answer data corresponding to each of the first question items and all the second answer data corresponding to each of the second question items are input,
causes the display unit to display an input field of additional first answer data when a message indicating that additional first answer data is present is input by a user,
when additional first answer data is input, causes the display unit to display an input field for inputting an additional second question item between the input additional first answer data and already input first answer data,
causes the display unit to display an input field for inputting additional second answer data corresponding to the additional second question item, and
stores the additional first answer data, the additional second question item, and the additional second answer data in the storage unit each time the additional first answer data, the additional second question item and the additional second answer data corresponding to the additional second question item are input or after all additional first answer data, all additional second question items and all additional second answer data corresponding to the additional second question items are input.

24. The non-transient computer readable medium according to claim 23, wherein
when a predetermined number of pieces or more of additional first answer data is input, the control unit is caused to cause the display unit to display a message for stopping subsequent input of the additional first answer data.

25. The non-transient computer readable medium according to claim 23, wherein the control unit
- stores the input additional first answer data in association with first answer data that is an answer to a same first question item among a plurality of pieces of already input first answer data,
- causes the display unit to display an input field for inputting a priority of the additional first answer data and the already input first answer data that are associated with each other, and
- stores input priorities in the storage unit for the plurality of pieces of already input first answer data and the input additional first answer data that are associated with each other.

26. The non-transient computer readable medium according to claim 23, wherein
the control unit
- causes the display unit to constantly display an additional answer data priority change field to enable change of a priority input with respect to a plurality of pieces of already input first answer data and the input additional first answer data that are associated with each other and stored in the storage unit, and
- when a changed priority is input into the additional answer data priority change field, stores change data of the input priority in the storage unit.

27. The non-transient computer readable medium according to claim 23, wherein
when collectively outputting the first question item, the second question item, the first answer data, the second answer data, the additional first answer data, the additional second question item, and the additional second answer data stored in the storage unit, the control unit executes the output in an order of a first question item having a higher priority, first answer data having a higher priority among first answer data and additional first answer data associated with the first question item having a higher priority, a second question item or an additional second question item including first answer data having a higher priority, and second answer data or additional second answer data corresponding to the second question item or additional second question item having a higher priority, based on priorities of first question items stored in advance or stored after being changed and the priorities of the plurality of pieces of already input first answer data and the input additional first answer data that are associated with each other.

28. The non-transient computer readable medium according to claim 23, wherein
when collectively outputting the first question item, the second question item, the first answer data, the second answer data, the additional first answer data, the additional second question item, and the additional second answer data stored in the storage unit, the control unit executes the output in an order of a first question item having a higher priority, first answer data having a higher priority among first answer data and additional first answer data associated with the first question item having a higher priority, a second question item or an additional second question item including first answer data having a higher priority, and second answer data or additional second answer data corresponding to the second question item or additional second question item having a higher priority, based on priorities of first question items stored in advance or stored after being changed and the priorities stored after being changed of the plurality of pieces of already input first answer data and the input additional first answer data that are associated with each other.

29. The non-transient computer readable medium according to claim 20, wherein
the control unit
- causes the display unit to constantly display a question item change button to enable change, addition, or deletion of contents of the plurality of first question items and/or a plurality of the second question items stored in the storage unit,
- stops the first processing to the fifth processing in execution when the question item change button is pressed,
- causes the display unit to display a question item change field, and
- stores change contents or addition contents input in the question item change field of the display unit in the storage unit, and when deletion of the first question item and/or the second question item is input in the question item change field, deletes an instructed first question item and/or second question item from the storage unit.

30. The non-transient computer readable medium according to claim 20, wherein
the control unit
- causes the display unit to display an input field for inputting which of the first answer data and/or the second answer data stored in the storage unit attachment data serving as a supplementary material for the first answer data and/or the second answer data is to be associated with, and
- stores the attachment data and the first answer data and/or the second answer data in the storage unit in association with each other based on contents input into the input field.

* * * * *